(12) United States Patent
Bauknecht et al.

(10) Patent No.: US 7,628,723 B2
(45) Date of Patent: Dec. 8, 2009

(54) MULTI-STAGE AUTOMATIC GEARBOX

(75) Inventors: Gert Bauknecht, Friedrichshafen (DE); Peter Ziemer, Tettnang (DE); Armin Gierling, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 407 days.

(21) Appl. No.: 11/659,488

(22) PCT Filed: Aug. 8, 2005

(86) PCT No.: PCT/EP2005/008599

§ 371 (c)(1),
(2), (4) Date: Feb. 6, 2007

(87) PCT Pub. No.: WO2006/015844

PCT Pub. Date: Feb. 16, 2006

(65) Prior Publication Data

US 2009/0029822 A1 Jan. 29, 2009

(30) Foreign Application Priority Data

Aug. 6, 2004 (DE) .................. 10 2004 038 289

(51) Int. Cl.
*F16H 3/62* (2006.01)
(52) U.S. Cl. .................................... 475/275
(58) Field of Classification Search ............. 475/275
See application file for complete search history.

(56) References Cited

U.S. PATENT DOCUMENTS 5,106,352 A 4/1992 Lepelletier (Continued)

FOREIGN PATENT DOCUMENTS

DE 199 49 507 4/2001

(Continued)

*Primary Examiner*—Ha D. Ho
(74) *Attorney, Agent, or Firm*—Davis & Bujold, P.L.L.C.

(57) ABSTRACT

A multi-speed automatic transmission comprises a drive input shaft (AN), a drive output shaft (AB), a double planetary transfer gearset (VS), a main gearset (HS) made as a coupled planetary gearset with at least three non-coupled input elements and one output element, and six shift elements (A to F), which, when engaged in pairs, enable at least eight forward gears to be engaged. An input element of the transfer gearset (VS) is connected with the drive input shaft (AN). An output element of the transfer gearset (VS) rotates at a speed slower than the input speed of the drive input shaft (AN). An element of the transfer gearset (VS) is fixed on a transmission housing (GG). The first input element of the main gearset (HS) can be connected via a second shift element (B) to the output element of the transfer gearset (VS), can be fixed by a third shift element (C), and can be connected with the drive input shaft (AN) by a sixth shift element (F). The second input element of the main gearset (HS) can be connected via a first shift element (A) to the output element of the transfer gearset (VS). The third input element of the main gearset (HS) can be fixed by a fourth shift element (D) and can be connected by a fifth shift element (E) to the drive input shaft (AN). The output element of the main gearset (HS) is connected to the drive output shaft (AR). The sixth shift element (F) is arranged axially between the transfer and main gearsets (VS, HS). A servomechanism (210) of the second shift element (B) is arranged mainly on the side of the transfer gearset (VS) facing away from the main gearset.

33 Claims, 13 Drawing Sheets

U.S. PATENT DOCUMENTS

| | | | |
|---|---|---|---|
| 6,139,463 A | 10/2000 | Kasuya et al. | |
| 6,558,287 B2 * | 5/2003 | Hayabuchi et al. | 475/271 |
| 6,634,980 B1 | 10/2003 | Ziemer | |
| 7,059,995 B2 * | 6/2006 | Stevenson | 475/284 |
| 7,247,119 B2 * | 7/2007 | Andres | 475/275 |
| 7,300,383 B2 * | 11/2007 | Nozaki et al. | 477/131 |
| 7,320,657 B2 * | 1/2008 | Nozaki et al. | 475/119 |
| 7,373,933 B2 * | 5/2008 | Kamada et al. | 123/568.21 |
| 7,393,299 B2 * | 7/2008 | Inoue et al. | 475/123 |
| 7,452,303 B2 * | 11/2008 | Seo | 475/284 |
| 2002/0142880 A1 | 10/2002 | Hayabuchi et al. | |
| 2002/0183154 A1 | 12/2002 | Ziemer | |
| 2003/0083173 A1 | 5/2003 | Miyazaki et al. | |
| 2004/0072648 A1 | 4/2004 | Dreibholz et al. | |
| 2004/0116238 A1 | 6/2004 | Ziemer | |
| 2005/0085332 A1 | 4/2005 | Ziemer | |

FOREIGN PATENT DOCUMENTS

| | | |
|---|---|---|
| DE | 101 15 987 | 10/2002 |
| DE | 102 50 373 | 7/2003 |
| DE | 102 10 348 | 10/2003 |
| DE | 102 21 095 | 7/2004 |
| DE | 103 18 565 | 11/2004 |
| EP | 0 997 663 | 5/2000 |
| EP | 1 375 962 | 1/2004 |
| EP | 1 510 728 | 3/2005 |
| JP | 2001182785 | 7/2001 |
| JP | 2001 349395 | 12/2001 |
| JP | 2002 295 609 | 10/2002 |
| JP | 2002 323 098 | 11/2002 |
| WO | WO 2003/087624 | 10/2003 |
| WO | WO 03/095865 | 11/2003 |
| WO | WO 2005/026579 | 3/2005 |
| WO | WO 2005/100819 | 10/2005 |

* cited by examiner

| Gear | Closed Shift Elements ||||||
|---|---|---|---|---|---|---|
| | A | B | C | D | E | F |
| 1 | ● | | | ● | | |
| 2 | ● | | ● | | | |
| 3 | ● | ● | | | | |
| 4 | ● | | | | | ● |
| 5 | ● | | | | ● | |
| 6 | | | | | ● | ● |
| 7 | | ● | | | ● | |
| 8 | | | ● | | ● | |
| R1 | | ● | | ● | | |
| R2 | | | | ● | | ● |

Fig. 1B
Prior Art

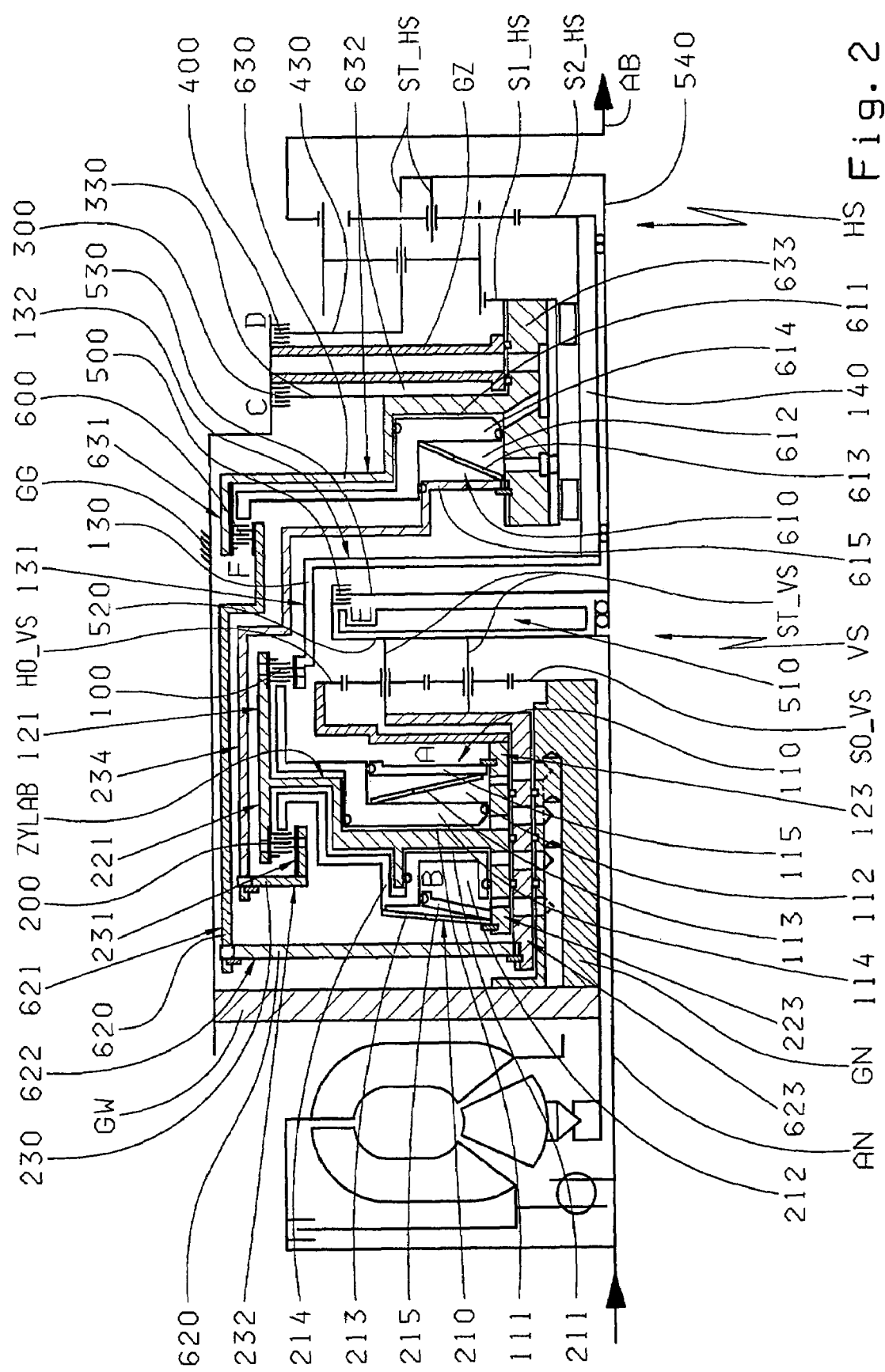

MULTI-STAGE AUTOMATIC GEARBOX

This application is a national stage completion of PCT/EP2005/008599 filed Aug. 8, 2005, which claims priority from German Application Serial No. 10 2004 038 289.1 filed Aug. 6, 2004.

FIELD OF THE INVENTION

The invention concerns a multi-speed automatic transmission.

BACKGROUND OF THE INVENTION

Automatic transmissions with several gears that can be engaged without range change are widely known. From U.S. Pat. No. 6,106,352 a 6-gear automatic transmission is known, in which a simple transfer planetary gearset is arranged co-axially with a two-carrier, four-shaft main gearset made as a Ravigneaux planetary gearset and five shift elements are provided. In this, the transfer planetary gearset is made as a non-shiftable reduction gear with a sun gear fixed to a transmission housing, whose output speed is slower than the speed of a drive input shaft of the automatic transmission and can be transferred, via two clutches, to two different elements of the main gearset, and one of the two elements can additionally be fixed relative to the transmission housing by a first brake. The input element of the main gearset, which can optionally be connected with the output element of the transfer planetary gearset or fixed relative to the transmission housing, will be referred to in what follows as the "first input element of the main gearset". Correspondingly, the other input element of the main gearset will be called the "second input element of the main gearset" in what follows. The speed of the drive input shaft can be transferred by a third clutch to a third input element of the main gearset, and this third element can also be fixed relative to the transmission housing by a second brake. A fourth element of the main gearset forms the output element of the main gearset and is exclusively in fixed connection with a drive output shaft of the automatic transmission.

Several arrangements of components alternative to this automatic transmission described in U.S. Pat. No. 5,106,352 are known, for example from U.S. Pat. No. 6,139,463 and DE 102 10 348 A1.

In the unpublished German patent application DE 10 221 095.0 by the present Applicant, a further development of the 6-gear automatic transmission known from U.S. Pat. No. 5,106,352, into a 7-gear automatic transmission, is described. Compared with U.S. Pat. No. 5,106,352, the transfer planetary gearset is made as a simple, shiftable "positive" planetary gearset of double-planetary structure with an additional, sixth shift element added. A carrier of the transfer planetary gearset forms the input element of the transfer planetary gearset in fixed connection with the drive input shaft of the automatic transmission. In contrast to U.S. Pat. No. 5,106,352, a sun gear of the transfer planetary gearset can be fixed relative to a transmission housing by the sixth shift element. Correspondingly, an annular with ring gear of the transfer planetary gearset forms the output element of the transfer planetary gearset that can be connected with two different elements of the main gearset, and rotates at a speed slower than or equal to that of the drive input shaft. For this kinematic coupling of the individual gearset elements and shift elements, DE 102 21 095.0 discloses numerous different arrangement variations of the transmission components relative to one another.

JP 2001/182785 A describes a further development of the 6-gear automatic transmission known from U.S. Pat. No. 5,106,352 into an 8-gear automatic transmission. Compared with U.S. Pat. No. 5,106,352, in this case, the transfer planetary gearset is made as a simple, non-shifting "positive" planetary gearset of double-planetary structure with an additional, sixth shift element added. A carrier of the transfer planetary gearset forms the input element of the transfer planetary gearset in fixed connection with the drive input shaft of the automatic transmission. A sun gear of the transfer planetary gearset is fixed relative to a transmission housing. Correspondingly, a ring gear of the transfer planetary gearset forms the output element of the transfer planetary gearset, that can be connected with two different elements of the main gearset, and always rotates at a speed slower than or equal to that of the drive input shaft. Via the additional, sixth shift element compared with U.S. Pat. No. 5,106,352, the first input element of the main gearset—which can optionally be connected with the output element of the transfer planetary gearset or fixed relative to the transmission housing—can now optionally also be connected to the drive input shaft of the transmission. With regard to the spatial arrangement of the shift elements, relative to one another and to the planetary gearsets, it is proposed in JP 2001/182785 A to arrange the two shift elements, by way of which the first and second input elements of the main gearset can be connected with the ring gear of the transfer planetary gearset, together with the additional, sixth shift element compared with U.S. Pat. No. 5,106,352, as a single structural group, axially between the transfer planetary gearset and the main gearset. The (fifth) shift element, already known from U.S. Pat. No. 5,106,352, by which the drive input shaft can be connected to the third input element of the main gearset, is arranged on the opposite side of the main gearset to this structural group, i.e., on the side of the main gearset facing away from the transfer planetary gearset. In addition, JP 2001/182785 A proposes to arrange the additional, sixth shift element, compared with U.S. Pat. No. 5,106,352, within the structural group spatially radially over the shift element by way of which the first input element of the main gearset can be connected to the ring gear of the transfer planetary gearset.

In the unpublished German patent application DE 103 18 565.8 by the present Applicant, an improved arrangement of components of the 8-gear automatic transmission known from JP 2001/182785 A is described. In order to make only comparatively few design changes, compared to the basic design of the 6-gear automatic transmission according to U.S. Pat. No. 5,106,352 upon which these variations are modelled, in DE 103 18 565.8, it is proposed to maintain the spatial position of the transfer planetary gearset, the Ravigneaux main gearset and the first five shift elements relative to one another in the transmission housing, known from the 6-gear automatic transmission, and to arrange the additional, sixth shift element compared with U.S. Pat. No. 5,106,352 in the transmission housing on the side of the transmission facing a drive motor, spatially between a transmission housing wall on the drive input side and a first shift element, by which the output element of the transfer planetary gearset can be connected with the second input element of the main gearset, but spatially also between the transmission housing wall on the drive input side and the transfer planetary gearset. The additional, sixth shift element compared with U.S. Pat. No. 5,106, 352 is thus arranged on the side of the transfer planetary gearset facing away from the main gearset.

The purpose of the present invention is to develop further the multi-speed automatic transmission described in JP 2001/182785 A and DE 103 18 565.8 with eight forward gears, and to provide alternative component arrangements for the planetary gearsets and the six shift elements.

SUMMARY OF THE INVENTION

The starting point for the invention is the transmission design described in JP 2001/182785 A or the unpublished German patent application DE 103 18 565.8 by the present applicant, for a multi-speed automatic transmission with at least eight forward gears, comprising a drive input shaft, a drive output shaft, a transfer gearset made as a double planetary gearset, a main gearset made as a coupled planetary gearset with at least three non-coupled input elements and an output element, and at least six shift elements. By the selective engagement of two of the shift elements at a time, a speed of the drive input shaft can be transferred to the drive output shaft in such manner that to shift from one gear to the next higher or the next lower gear, only one of the shift elements, actuated at the time, is disengaged and one other shift element is engaged. The entire disclosure content of the unpublished German patent application DE 103 18 565.8 by the present Applicant is expressly incorporated by reference as part of the disclosure content of the present invention.

An input element of the transfer planetary gearset is in permanent connection with the drive input shaft. An output element of the transfer planetary gearset always rotates at a speed slower than that of the drive input shaft. A third element of the transfer planetary gearset is fixed relative to a transmission housing. The output speed of the transfer planetary gearset can be transferred, via two shift elements, to two different input elements of the main gearset. The speed of the drive input shaft can also be transferred to two different input elements of the main gearset by two other shift elements. The output element of the main gearset is in permanent connection with the drive output shaft.

In a preferred embodiment of this transmission design as an 8-gear automatic transmission, a (coupled) carrier of the transfer planetary gearset forms its input element permanently connected with the drive input shaft, a ring gear of the transfer planetary gearset forms its output element that can be connected with two different input elements of the main gearset, and a sun gear of the transfer planetary gearset forms its third element fixed relative to the transmission housing. The transfer and main gearsets are arranged co-axial with one another. The main gearset can be made as a two-carrier, four-shaft transmission having the structure of a "Ravigneaux planetary gearset", with a first sun gear as the first input element of the main gearset, which can optionally be connected with the ring gear of the transfer gearset or the drive input shaft or can be fixed relative to the transmission housing, with a second sun gear as the second input element of the main gearset, which can be connected with the ring gear of the transfer gearset, with a (coupled) carrier as the third input element of the main gearset, which can optionally be connected with the drive input shaft or fixed relative to the transmission housing, and with a ring gear as the output element of the main gearset, which is permanently connected with the drive output shaft. In this case:

an input element of the first shift element is connected to the output element of the transfer gearset;
an output element of the first shift element is connected to the second input element of the main gearset;
an input element of the second shift element is connected to the output element of the transfer gearset;
an output element of the second shift element is connected to the first input element of the main gearset;
an input element of the third shift element is connected to the transmission housing;
an output element of the third shift element is connected to the first input element of the main gearset;
an input element of the fourth shift element is connected to the transmission housing;
an output element of the fourth shift element is connected to the third input element of the main gearset;
an input element of the fifth shift element is connected to the drive input shaft;
an output element of the fifth shift element is connected to the third input element of the main gearset;
an input element of the sixth shift element is connected to the drive input shaft;
an output element of the sixth shift element is connected to the first input element of the main gearset, and
the output element of the main gearset is permanently connected to the drive output shaft.

However, the main gearset can also be made as a two-carrier, four-shaft transmission with two coupled one-carrier planetary gearsets in which, for example, the first input element of the main gearset is formed by a first sun gear in fixed connection with a second carrier, which can optionally be connected to the ring gear of the transfer gearset or the drive input shaft or fixed relative to the transmission housing, and such that the second input element of this main gearset is formed by a second sun gear which can be connected to the ring gear of the transmission gearset, and such that a first carrier and a second ring gear of the main gearset are coupled to one another to form the third input element of the main gearset and can optionally be connected to the drive input shaft or fixed relative to the transmission housing, and a first ring gear of the main gearset forms the output element of this main gearset and is permanently connected to the drive output shaft. In this case the connection of the input and output elements of the six shift elements to the three input elements of the main gearset corresponds to the connections described earlier for the example of the Ravigneaux main gearset.

The main gearset can for example also be made as a "three-carrier, five-shaft transmission" with three coupled one-carrier planetary gearsets, or else as a "three-carrier, five-shaft transmission reduced to a two-carrier unit" with three coupled one-carrier planetary gearsets, in which at least two of these individual planetary gearsets are coupled to one another ("reduced") by a common carrier and a further common central gear (i.e., either via their sun gears or via their ring gears). Accordingly, the main gearset can also be made for example as a "four-carrier, six-shaft transmission reduced to a two-carrier unit", in which the in principle four individual planetary gearsets, present and coupled to one another, are combined in such manner that the main gearset comprises only two carriers. In contrast to the connections of the six shift elements to the input elements of a main gearset of the "two-carrier, four-shaft planetary gearset" type, in relation to the kinematic connection of the input and output elements of the third and sixth shift elements to the individual main gearset elements there are various possibilities, in which case:

the input element of the third shift element is connected to the transmission housing;
the output element of third shift element is connected to the first input element of the main gearset or to an input element of the main gearset which is close to this first input element in the speed diagram;
the input element of the sixth shift element is connected to the drive input shaft;
the output element of the sixth shift element is connected to the first input element of the main gearset or to an input element of the main gearset which is close to this first input element in the speed diagram.

In all the design variations mentioned, in the first forward gear, the first and fourth shift elements are engaged, in the second forward gear, the first and third shift elements, in the third forward gear, the first and second shift elements, in the fourth forward gear, the first and sixth shift elements, in the fifth forward gear, the first and fifth shift elements, in the sixth forward gear, the fifth and sixth shift elements, in the seventh forward gear, the second and fifth shift elements, and in the eighth forward gear, the third and fifth shift elements are engaged. In the reverse gear, the fourth and, in addition, either the second or the sixth shift elements are engaged.

According to the invention it is now proposed that the sixth shift element, at least a disk set of this sixth shift element and a servomechanism to actuate the disk set of the sixth shift element, is spatially arranged in an area axially between the transfer gearset and the main gearset, and a servomechanism, to actuate a disk set of the second shift element, is spatially arranged mainly on the side of the transfer gearset facing away from the main gearset. At least a pressure chamber of this servomechanism of the second shift element is arranged on the side of the transfer gearset facing away from the main gearset.

In a first embodiment of the spatial arrangement of the other four shift elements, it is proposed that the fifth shift element is directly adjacent the transfer gearset, on the side of the latter facing toward the main gearset. In this case, the sixth shift element is spatially arranged in an area axially between the fifth shift element and the main gearset. To form a preassembled structural group, the output element of the sixth shift element, connected with the first input element of the main gearset, is expediently made as a cylindrical outer disk carrier which holds both the outer disks of the disk set of the sixth shift element, preferably made as steel disks, and the servomechanism of the sixth shift element. Thus, the servomechanism of the sixth shift element always rotates at the speed of the first input element of the main gearset, and actuates the disk set of the sixth shift element, on engagement, axially in the direction of the main gearset. A pressure medium supply to a pressure chamber of this servomechanism of the sixth shift element and also a lubricant supply to a pressure equalization chamber, which can be filled with unpressurized lubricant for the dynamic pressure compensation of the rotating pressure chamber of the servomechanism of the sixth shift element, can pass in a relatively simply designed manner from the transmission housing into a rotating hub of this outer disk carrier of the sixth shift element. The third shift element made as a brake, by way of which the first input element of the main gearset can be fixed relative to the transmission housing, is arranged close to the sixth shift element. If the third shift element is made as a disk brake, the corresponding disk set of this brake is arranged closer to the main gearset than the disk set of the sixth shift element. If the third shift element is made as a belt brake, the corresponding brake belt can also be arranged spatially over the disk set of the sixth shift element, and the outer disk carrier of the sixth shift element can then expediently have a working surface for this brake belt on its outer diameter. If the drive input and drive output shafts are co-axial with one another, then the fourth shift element, also made as a brake, is adjacent the third shift element in the direction of the main gearset; in principle, the first shift element is thus arranged closer to the main gearset than the third shift element. If the drive input and drive output shafts are not co-axial, then the fourth shift element, made as a brake, can also be arranged on the side of the main gearset facing away from the transfer gearset and the sixth shift element and third shift element. With regard to the spatial arrangement of the first shift element, an input element common to this first and to the second shift element can be provided, which is connected to the output element of the transfer gearset and is arranged at least mainly on the side of the transfer gearset facing away from the main gearset, in particular with the structure of a common outer disk carrier, such that the servomechanisms of the first and second shift elements are separated from one another only by a casing surface of this outer disk carrier and a pressure chamber of the servomechanism of the first shift element is arranged closer to the transfer gearset than the pressure chamber of the servomechanism of the second shift element.

In a second embodiment of the spatial arrangement of the other four shift elements, which is particularly suitable for a drive train whose drive input and drive output shafts are not co-axial with one another, it is proposed that the sixth shift element is directly adjacent the transfer gearset, on the side of the transfer gearset facing toward the main gearset. To form a preassembled structural group, the input element of the sixth shift element connected with the drive input shaft is in this case expediently formed as a cylindrical outer disk carrier and holds both the outer disks of the disk set of the sixth shift element, preferably made as steel disks, and also the servomechanism of the sixth shift element. Thus, the servomechanism of the sixth shift element always rotates at the speed of the drive input shaft and actuates the disk set of the sixth shift element, on engagement, axially toward the main gearset. A pressure medium supply to a pressure chamber of this servomechanism of the sixth shift element and also a lubricant supply to a pressure equalization chamber, that can be filled with unpressurized lubricant for the dynamic pressure compensation of the rotating pressure chamber of the servomechanism of the sixth shift element, can pass through the drive input shaft in a relatively simply designed way. The first shift element, in particular, a pressure chamber of its servomechanism, is preferably spatially arranged in an area axially between the sixth shift element and the main gearset, preferably adjacent the sixth shift element, such that a disk set of this first shift element can also be spatially arranged in an area radially over the sixth shift element. Preferably, the servomechanism of the first shift element always rotates at the speed of the second input element of the main gearset, and actuates the disk set of the first shift element axially in the direction of the transfer gearset on engagement. Looking axially in the direction of the main gearset, a disk set of the fifth shift element is axially adjacent the disk set of the first shift element, and a pressure chamber of a servomechanism of this fifth shift element can be arranged on the side of the transfer gearset facing away from the main gearset, and will then always rotate at the speed of the drive input shaft. If the fourth shift element is made as a disk brake, then a disk set of this fourth shift element, viewed axially in the direction of the main gearset, is expediently positioned axially adjacent the disk set of the fifth shift element, preferably close to the main gearset. The third shift element, also made as a brake, is preferably arranged on the side of the main gearset opposite to transfer gearset.

BRIEF DESCRIPTION OF THE DRAWINGS

The invention will now be described, by way of example, with reference to the accompanying drawings in which all comparable structural elements are given the same reference numerals and in which:

FIG. 1B is a shift scheme for the transmission according to FIG. 1;

FIG. 2 is a first example embodiment of a transmission design according to the invention;

DETAILED DESCRIPTION OF THE INVENTION

Figure 1A:
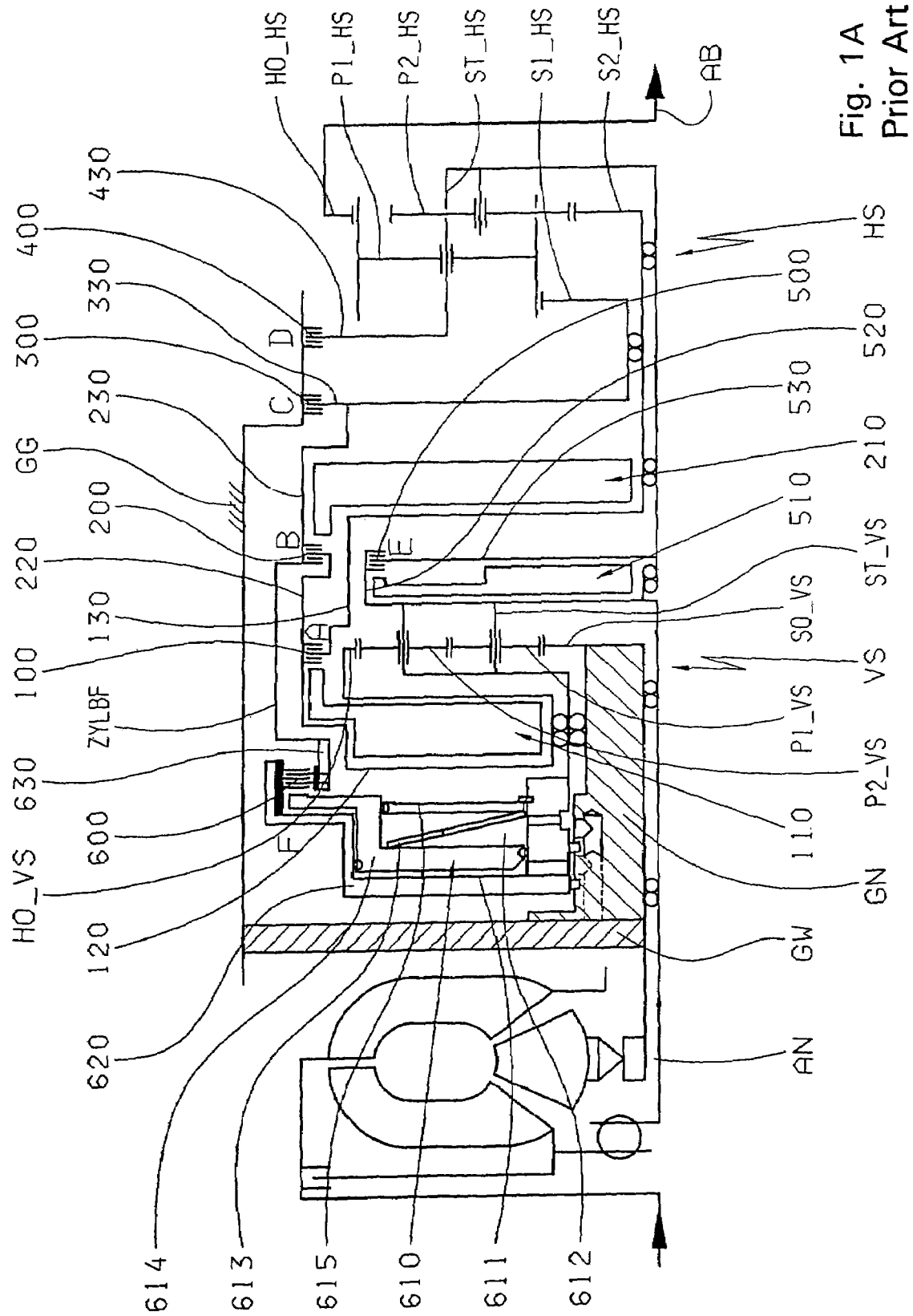
FIG. 1A shows a transmission design according to the relevant prior art.

For a better understanding, the prior art upon which the invention is based will first be explained. FIG. 1A shows the transmission design of the relevant prior art according to DE 103 18 565.8, and FIG. 1B the corresponding shift scheme. In FIG. 1A, AN denotes a drive input shaft of the automatic transmission, which is in active connection with a drive motor (not shown) of the automatic transmission, in the example shown, via a torque converter with a torsion damper and a converter bridging clutch. AB denotes a drive output shaft of the automatic transmission arranged co-axially with the drive input shaft AN, which is in active connection with at least one drive axle of the motor vehicle. Clearly, instead of the torque converter, a frictional clutch could be arranged as the starting element for the automatic transmission between the drive motor and the automatic transmission. The drive motor could also be connected with the drive input shaft AN of the transmission, via a simple torsion damper, a dual-mass flywheel or a solid shaft and, in that case, a frictional shift element would have to be formed within the automatic transmission as the starting element of the transmission.

The automatic transmission comprises a transfer gearset VS and a main gearset HS arranged co-axially with (but not directly adjacent to) this transfer gearset VS. The transfer gearset VS is made as a positive planetary gearset of double planetary structure, with a ring gear wheel HO_VS, with a sun gear wheel SO_VS, and with a carrier ST_VS formed of two individual carriers, on which are mounted inner planetary gears P1_VS, which mesh with the sun gear SO_VS, and outer planetary gears P2_VS, which mesh with the inner planetary gears P1_VS and the ring gear HO_VS, so that they can rotate. This transfer gearset VS, therefore, operates as a non-shifting reduction gear and produces an output speed slower than the input speed of the drive input shaft AN of the automatic transmission. For this, the sun gear SO_VS of the transfer gearset VS is fixed relative to a transmission housing GG and the carrier ST_VS is permanently connected to the drive input shaft AN. The ring gear HO_VS forms the output element of the transfer gearset VS and can be connected with individual input elements of the main gearset HS, via two shift elements A, B.

The main gearset HS is made as a coupled two-carrier, four-shaft planetary gearset with three input elements not coupled to one another and one output element, in the structural form of a Ravigneaux gearset with two sun gears S1_HS and S2_HS, a ring gear HO_HS and a coupled carrier ST_HS, on which long planetary gears P1_HS, which mesh with the first sun gear S1_HS and the ring gear HO_HS, and short planetary gears P2_HS which mesh with the second sun gear S2_HS and the long planetary gears P1_HS, so as to rotate. In this, the first sun gear S1_HS forms the first input element of the main gearset HS, the second sun gear S2_HS, the second input element of the main gearset HS, the coupled carrier ST_HS, the third input element of the main gearset HS and the ring gear HO_HS, the output element of the main gearset HS.

The automatic transmission has a total of six shift elements A to F. The shift elements A, B, E and F are formed as clutches, and the shift elements C and D as brakes. For this, the second sun gear S2_HS of the main gearset HS can be connected, via the first shift element A, with the ring gear HO_VS of the transfer gearset VS. Furthermore, the fourth sun gear S1_HS of the main gearset HS can be connected, via the second shift element B, with the ring gear HO_VS of the transfer gearset VS, via the third shift element C, it can be fixed relative to the transmission housing GG, and via the sixth shift element F, it can be connected with the drive input shaft AN. In addition, the carrier ST_HS of the main gearset HS can be fixed relative to the transmission housing GG, via the fourth shift element D, and can be connected with the drive input shaft AN, via the fifth shift element E. As a result of this interconnection of the individual elements of the main gearset HS to the individual shift elements, the carrier ST_HS of the main gearset HS can also be connected with the first sun gear S1_HS of the main gearset HS by simultaneous engagement of the fifth and sixth shift elements E, F. The ring gear HO_HS of the main gearset HS is permanently and exclusively connected to the drive output shaft AB.

Figure 1C:
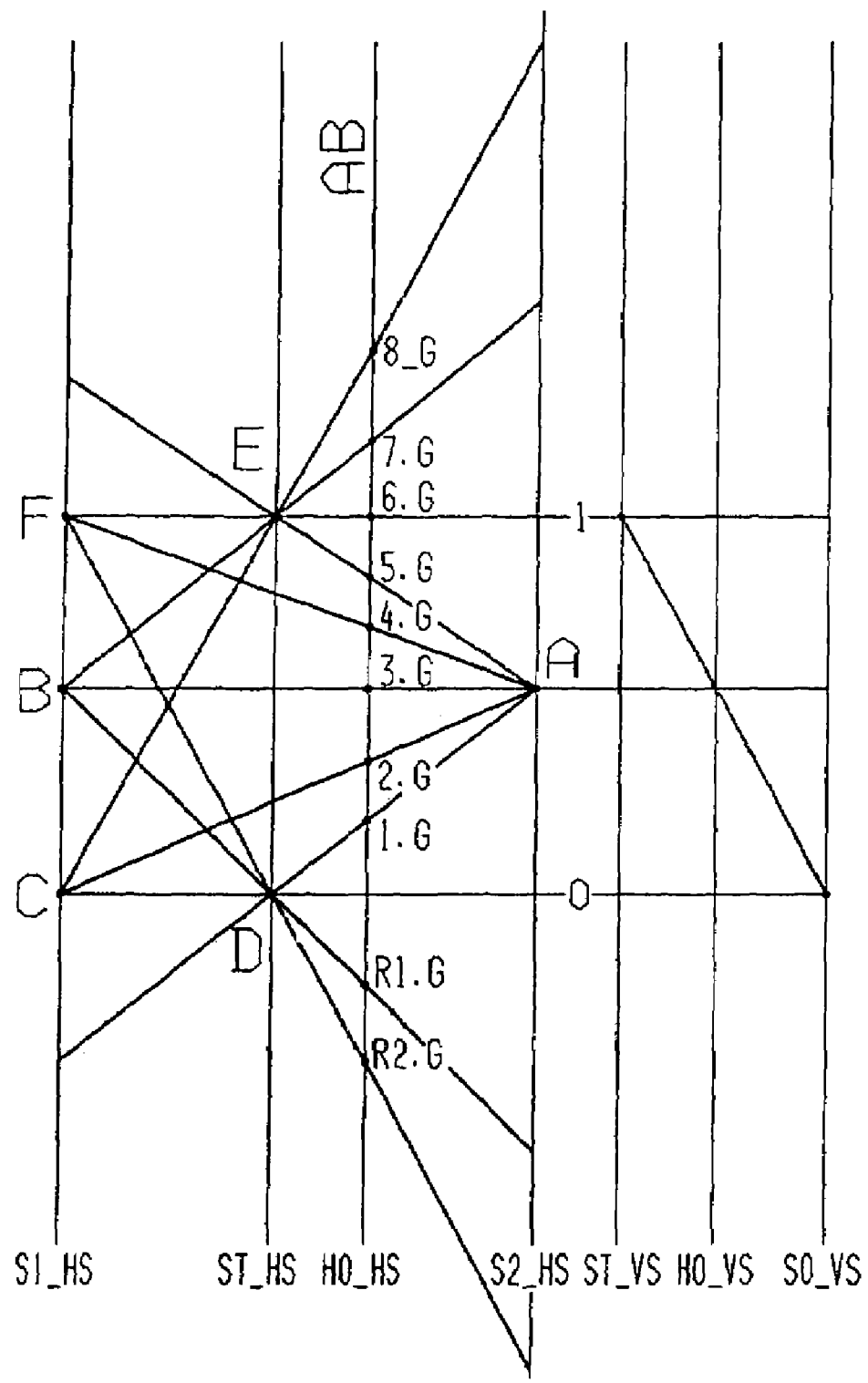
FIG. 1C is a speed diagram for the transmission according to FIG. 1.

FIG. 1B shows a shift scheme for the multi-speed automatic transmission represented in FIG. 1A. A total of eight forward gears can be engaged without range change, in such manner that to change from one gear to the next higher or lower gear, of the shift elements actuated at the time, in each case, only one shift element is disengaged and a different shift element is engaged. In first gear "1", the clutch A and the brake D are engaged, in second gear "2", the clutch A and brake C are engaged, in third gear "3", the clutches A and B, in fourth gear "4", the clutches A and F, in fifth gear "5", the clutches A and E, in sixth gear "6", the clutches E and F, in seventh gear "7", the clutches B and E and in eighth gear "8", the brake C and the clutch E. In a first reverse gear "R1", the clutch B and the brake D are engaged. A second reverse gear "R2" can also be provided, by engaging clutch F and brake D. FIG. 1C shows a speed diagram for the multi-speed automatic transmission of FIG. 1A.

Returning to FIG. 1A, the disk sets and individual input and output elements of the shift elements are indexed individually. Thus, the disk set of the first shift element A is indexed 100, the input element of the first shift element A is 120, the output element of first shift element A is 130, and a servomechanism for the actuation of the disk pack 100 of the first shift element A is 110. Correspondingly, the disk set of the other shift element B, C, D, E and F are indexed 200, 300, 400, 500 and 600, and the input elements of the other shift elements B, E and F are 220, 520 and 620. Also correspondingly, the output elements of the other clutches B, C, D, E and F are indexed 230, 330, 430, 530 and 630, and servomechanisms of the other clutches B, E and F for actuating their respective disk sets 200 or 500 or 600 are indexed 210, 510 and 610.

With regard to the spatial arrangement of the shift elements and gearsets relative to one another within the transmission housing, indexed GG, DE 103 18 565.8 proposes the following: viewed axially, the fifth shift element E formed as a clutch, is arranged between the transfer gearset VS and the main gearset HS, axially directly adjacent the transfer gearset VS. The second shift element B, also made as a clutch, is arranged axially between the transfer gearset VS and the main gearset HS, with the disk set 200 of this clutch B spatially approximately radially over the disk set 500 of the clutch E and the servomechanism 210 of the clutch B axially adjacent the clutch E on its side facing away from the transfer gearset VS. Viewed axially in the direction of the main gearset HS, the clutch B is followed, first, by the third shift element C made as a brake, then by the fourth shift element D also made as a brake, and then by the main gearset HS. The disk set 100 of the first shift element A, made as a clutch, is spatially arranged approximately over the transfer gearset VS. The servomechanism 110 of this clutch A is at least for the most part arranged on the side of the transfer gearset VS facing away from the main gearset HS. On the side of the servomechanism 110 of the clutch A facing away from the transfer gearset VS, viewed axially between the clutch A and a housing wall GW, fixed to the housing on the drive side, i.e., on the side of the clutch A and the transfer gearset VS facing away from the main gearset HS, is arranged the sixth shift element F made as a clutch.

As an example embodiment of a servomechanism of a shift element, the servomechanism 610 of the sixth shift element F is shown in more detail in FIG. 1A. This servomechanism 610 is arranged inside a cylindrical disk carrier, which forms the input element 620 of the clutch F and correspondingly rotates always at the speed of the drive input shaft AN of the transmission. The servomechanism 610 has a pressure chamber 611 formed by a casing surface section of the disk carrier of clutch F and a piston 614 of the servomechanism 610. When this pressure chamber 611 is pressurized, the piston 614 moves against the force of a restoring element 613 of the servomechanism 610, here made for example as a cup spring, axially in the direction of the transfer gearset VS so as to actuate or engage the disk set 600 of the clutch F. For the preferably complete compensation of a dynamic pressure of the rotating pressure chamber 611, the servomechanism 610 also comprises a pressure equalization chamber 612 that can be filled with unpressurized lubricant and is formed by a surface of the piston 614 and a diaphragm plate 615. The input element 620 is mounted to rotate on a hub GN, fixed to the transmission housing, which extends from the fixed housing wall GW into the inside space of the transmission housing GG, axially in the direction of the transfer gearset VS as far as the sun gear SO_VS of the transfer gearset VS and is in rotationally fixed connection with this sun gear SO_VS. Correspondingly, this hub GN, fixed on the transmission housing, also has channels for supplying pressure medium and lubricant to the pressure chamber and pressure equalization chamber of the clutch F.

Referring to FIG. 2, a first example embodiment of a transmission design according to the present invention will now be explained. Compared with FIG. 1A the spatial position of the shift elements A, B, F relative to the gearset VS, HS and relative to one another and to the other shift elements C, D, E is clearly different, while the kinetic coupling of the gearsets and shift elements and the design of the planetary gearsets VS and HS co-axially next to (but not directly next to) one another are maintained.

As in FIG. 1A, the fifth shift element E, made as a clutch, is arranged axially between the transfer gearset VS and the main gearset HS, axially directly adjacent the transfer gearset VS. The input element 520 of clutch E is made as an outer disk carrier geometrically in the form of a cylindrical pot, open in the direction of the main gearset HS, whose disk-shaped pot bottom is connected, on one hand, with the coupled carrier ST_VS of the transfer gearset VS and, on the other hand, in the area of its smallest diameter, with the drive input shaft AN, and whose cylindrical section holds the outer disks of the disk set 500 of clutch E on its inside diameter. A carrier plate of the transfer gearset VS facing the main gearset HS and the outer disk carrier of clutch E can thus be made as one piece. A servomechanism 510 of clutch E, only illustrated schematically, is arranged within a cylindrical space formed by the outer disk carrier 520 of clutch E, and is mounted to move axially on the hub area of this outer disk carrier 520, always rotates at the speed of the drive input shaft AN, and actuates the disk set 500 associated with it when clutch E is engaged, axially in the direction of the main gearset HS. The output element 520 of clutch E is correspondingly made as an inner disk carrier, centrally connected with a carrier shaft 540 which extends starting from the hub area of this output element 530 of clutch E axially toward the main gearset HS, passing centrally completely through the main gearset HS and being connected on the side of the main gearset HS opposite the transfer gearset VS to the coupled carrier ST_HS of the main gearset HS. This coupled carrier ST_HS forms the third input element of the main gearset HS. The hub of the output element 530 of clutch E or the carrier shaft 540 is mounted to rotate on the drive input shaft AN.

Also unchanged, compared with FIG. 1A, is the spatial position of the two shift elements C and D, for example made as disk brakes, relative to the two gearsets VS and HS, The fourth shift element D with its disk set 400 is arranged close to the main gearset HS on its side facing the transfer gearset VS. The output element 430 of brake D, made as an inner disk carrier, is connected with the coupled carrier ST_HS of the main gearset HS, and this carrier ST_HS passes completely axially through the main gearset HS. Viewed in the direction of the transfer gearset VS, the disk set 300 of brake C is axially adjacent the disk set 400 of brake D. The output element 330 of brake C is made as an inner disk carrier. The outer disk carrier of the two brakes C and D can be simply integrated into the transmission housing GG, as also can the servomechanisms for actuating the disk sets 300 and 400 (not shown for the sake of simplicity). Of course, a separate outer disk carrier can also be provided for the brakes C and D, which is then connected, in a rotationally in a fixed manner, with the transmission housing GG and can also accommodate axially movably the servomechanisms of brakes C and D.

As can be seen in FIG. 2, the sixth shift element F, made as a clutch, is now spatially arranged in an area axially between the transfer gearset VS and the main gearset HS, in the example shown axially between the clutch E and the main gearset HS. The output elements 630 of clutch F is made as an outer disk carrier, geometrically in the form of a pot, open in the direction of the transfer gearset VS. A hub 633 of this outer disk carrier of clutch F is directly adjacent the main gearset HS and is connected, in a rotationally fixed manner, to the first sun gear S1_HS of the main gearset HS. This sun gear S1_HS, as is known, forms the first input element of the main gearset HS. In the example embodiment shown, approximately in the middle of the hub, an offset, disk-shaped section 632 of the outer disk carrier 630 of clutch F is adjacent the hub 633 and extends radially outward as far as a diameter somewhat larger than the outer diameter of the disk set 600 of clutch F. Next to the outer diameter of this disk-shaped section 632 there is a cylindrical section 631 of the outer disk carrier 630 of clutch F, which extends axially in the direction of the transfer gearset VS and holds, on its inside diameter, the outer disks (preferably made as externally toothed steel disks) of the disk set 600 of clutch F. The disk-shaped section 632 of the outer disk carrier 630 of clutch F is additionally connected, in the area of its offset, with the output element 330 of brake C, made as an inner disk carrier. Thus, the brake C is kinematically connected, via the output element 630 of clutch F, to the first input element (here the first sun gear S1_HS) of the main gearset HS. The hub 633 of the output element (outer disk carrier) 630 of clutch F is mounted to rotate on a second sun shaft 140, which forms the kinematic connection between the output element 130 of the second shift element A and the second input element (here, the second sun gear S2_HS) of the main gearset HS, and therefore passes centrally completely through the hub 633 and also the entire clutch F in the axial direction. This second sun shaft 140, made as a hollow shaft, is in turn mounted on the carrier shaft 540, which forms the kinematic connection between the output element 530 of clutch E and the third input element (here, the coupled carrier ST_HS) of the main gearset HS, and thus passes centrally completely through the second sun shaft 140 in the axial direction.

In the example embodiment shown in FIG. 2, the disk sets 500 and 600 of clutches E and F are arranged next to one another in the axial direction, the disk set 600 of clutch F having a larger diameter than the disk set 500 of clutch E. Depending on the design of these two clutches E, F in relation to their axial length, the disk set 600 of clutch F can also be spatially arranged at least partly in an area radially over the disk set 500 of clutch E.

The servomechanism 610 of clutch F is arranged, at least mainly, inside a cylindrical space formed by the output element 630 (or outer disk carrier) of clutch F. A pressure chamber 611 of this servomechanism 610 is formed by a casing surface of this output element (outer disk carrier) 630 and a piston 614 that can move axially relative to this output element (outer disk carrier) 630. A restoring element 613, for example made as a cup spring, is axially fixed on the hub 633 of the output element (outer disk carrier) 630 and pre-stresses the piston 614 axially against the output element (outer disk carrier) 630 of clutch F. In addition, the servomechanism 610 comprises a pressure equalization chamber 612, which can be filled with unpressurized lubricant to offset the dynamic pressure of the pressure chamber 611, which always rotates at the speed of the first input element (i.e., the first sun gear S1_HS) of the main gearset HS, this pressure equalization chamber 612 is arranged on the side of the pressure chamber 611 facing the transfer gearset VS and is formed by a casing surface of the piston 614 and a diaphragm plate 615. The diaphragm plate 615 of the servomechanism 610 is axially fixed on the hub 633 of the output element (outer disk carrier) 630 of the clutch F, and is also rotationally fixed to this hub 633. Spatially, the pressure chamber 611 is thus arranged closer to the main gearset HS than the pressure equalization chamber 612, and the pressure chamber 612 is arranged closer to the transfer gearset VS than the pressure chamber 611. When the pressure chamber 611 is pressurized with pressure medium, the piston 614 actuates the disk set 600 of clutch F, against the restoring force of the restoring element 613, axially in the direction of the transfer gearset VS. In the example embodiment shown, pressure medium is supplied to the pressure chamber 611 and lubricant to the pressure equalization chamber 612 through corresponding holes or ducts in the transmission housing GG. For this purpose an intermediate housing wall GZ connected, in a rotationally fixed manner, to the transmission housing GG or an element fixed on the transmission housing is provided, which is spatially arranged in an area axially between the brakes C and D and has corresponding pressure medium and lubricant ducts. The pressure medium and lubricant first pass through these pressure medium and lubricant ducts in the intermediate housing wall GZ or the element of the rotating hub 633 of the output element (outer disk carrier) 630 of the sixth shift element F attached to the transmission housing, and from there, through corresponding holes or ducts in the hub 633, to the pressure chamber and pressure equalization chamber 611, 612 respectively.

The input element 620 of clutch F is made as an inner disk carrier, geometrically in the form of a pot open in the direction of the main gearset HS, comprising a hub 623, a disk-shaped section 622 and a cylindrical section 621. The hub 623 is spatially arranged on the side of the transfer gearset VS facing away from the main gearset HS, and is in this case mounted to rotate on a hub GN, fixed on the transmission housing. This housing hub GN extends, starting from a housing wall GW, fixed to the transmission housing, which forms the end of the transmission housing nearer the transfer gearset, axially as far as the transfer gearset VS and is connected with its sun gear SO_VS. On its side near the transfer gearset, the hub 623 is connected, in a rotationally fixed manner, to a carrier plate of the coupled plate ST_VS of the transfer gearset VS remote from the main gearset. This coupled carrier ST_VS passes through the transfer gearset VS in the axial direction and connects the input element 620 of clutch F on the side of the transfer gearset VS near the main gearset to the drive input shaft AN. The disk-shaped section 622 of the input element 620 of clutch F is connected to the hub 623 on its side remote from the transfer gearset, in the example embodiment shown with positive locking by way of a suitable carrier profile. Starting from the hub 623, this disk-shaped section 622 extends radially outward as far as a diameter just under the inside diameter of the transmission housing GG. At its outer diameter the disk-shaped section 622 is connected with the cylindrical section 621 of the input element 620 of clutch F, in the example embodiment shown, with positive locking by way of a suitable carrier profile. Starting from the disk-shaped section 622, this cylindrical section 621 extends axially toward the main gearset HS as far as the disk set 600 of clutch F. In accordance with its function as an inner disk carrier, a carrier profile is provided at the end of this cylindrical section 621 near the main gearset and on the outer diameter, to hold the inner disks of the disk set 600, preferably made as internally toothed lining disks. Along its axial run the input element 620 of clutch F completely radially overlaps the clutches B and A, the transfer gearset VS and the clutch E.

In contrast to FIG. 1A, FIG. 2 shows a disk carrier ZYLAB, common to the two shift elements A, B, made as clutches, is provided, which forms the input element of both clutches A, B connected to the drive input shaft AN and is arranged spatially mainly on the side of the transfer gearset VS facing away from the main gearset HS. In the example embodiment shown, this disk carrier ZYLAB is an outer disk carrier for both clutches A, B, to hold outer disks of the disk sets 100, 200 of the two clutches A, B (preferably made as externally toothed steel disks). The disk set 200 of the second shift element B is arranged on the side of the transfer gearset VS facing away from the main gearset HS. The disk set 100 of the first shift element A is spatially arranged in an area over the transfer gearset VS, but could also be arranged in an area over the clutch E, axially adjacent the transfer gearset VS or, like the disk set 200, on the side of the transfer gearset VS facing away from the main gearset HS. In any case, the disk set 100 of clutch A is arranged closer to the main gearset HS than the disk set 200 of clutch B. The concept of the outer disk carrier common to both clutches A, B favors the use of identical components; thus, the disk sets 100, 200 preferably have the same diameter.

Geometrically, the disk carrier ZYLAB, common to the two clutches A, B, is formed as a cylindrical pot, open at both ends, with a pot bottom arranged in the middle of the cylinder and a hub extending axially on each side of the pot bottom. The section of the hub of the disk carrier ZYLAB near the transfer gearset is indexed 123, and the second section of this hub remote from the transfer gearset and spatially separated from the first section 123 by the pot bottom itself, is indexed 223. As this nomenclature shows, the first section 123 of the hub of the disk carrier ZYLAB is associated with the first shift element A, and the second section 223 of this hub with the second shift element B. On its side close to the transfer gearset, the hub of the disk carrier ZYLAB is connected, in a rotationally fixed manner, by way of the disk-shaped element to the ring gear HO_VS of the transfer gearset VS, for example by way of a carrier profile. This disk-shaped element has the function of a ring gear carrier for the transfer gearset VS and extends radially parallel and adjacent the carrier plate of the transfer gearset VS remote from the main gearset. The hub of the disk carrier ZYLAB with its sections 123 and 223 is mounted to rotate on the hub 623 of the input element 620 of clutch F, spatially axially between the carrier plate of the transfer gearset VS remote from the main gearset and the disk-shaped section 622 of the input element 620 of clutch F arranged close to the housing wall GW.

Starting approximately from the middle of the hub of the disk carrier ZYLAB, the at least partly disk-shaped pot bottom of the disk carrier ZYLAB extends radially outward as far as the outer diameter of the disk sets 100 and 200 of the two clutches A, B. At the outer diameter of the pot bottom of the disk carrier ZYLAB and starting from this pot bottom, a first cylindrical section 121 of the disk carrier ZYLAB associated with clutch A extends axially in the direction of the main gearset HS. On the inside diameter of this cylindrical section 121, a carrier profile is provided to hold the outer disks of the disk set 100 of clutch A, preferably made as externally toothed steel plates. In the example embodiment shown, the first cylindrical section 121 of the disk carrier ZYLAB overlaps the transfer gearset VS in the axial direction. At the outer diameter of the pot bottom of the disk carrier ZYLAB, starting from this pot bottom, a cylindrical section 221 of the disk carrier ZYLAB associated with clutch B extends axially in the direction away from the main gearset HS. On the inside diameter of this cylindrical section 221 a carrier profile is provided to hold the outer disks of the disk set 200 of clutch B, preferably made as externally toothed steel disks.

Of course, instead of the steel disks (with no friction lining) and lining disks in alternation, steel disks lined on one side with the friction lining can also be used and in that case an externally toothed lined steel disk and an internally toothed lined steel disk must be combined in alternation to form a disk set. Of course, instead of the proposed steel disks, disks of carbon or carbon fiber, or other suitable composite materials can also be used.

A servomechanism 110 of the first shift element A is arranged at least partly radially over the hub section 123 of the hub of the input element ZYLAB common to the two clutches A and B near the transfer gearset, within a cylindrical space formed by the disk carrier ZYLAB and in particular by its cylindrical section 121. Thus, this servomechanism 110 always rotates at the speed of the output element of the transfer gearset VS, i.e., at the speed of the ring gear HO_VS, and comprises a pressure chamber 111 that can be filled with pressure medium, a pressure equalization chamber 112 that can be filled with unpressurized lubricant to offset a dynamic pressure of the rotating pressure chamber 111, a piston 114 mounted to move axially on the disk carrier ZYLAB to actuate the disk set 100 of clutch A, a diaphragm plate 115, and a restoring element 113 to restore the piston 114. The pressure chamber 111 is formed by a casing surface of the disk carrier ZYLAB and the piston 114 mounted to move axially on the hub section 123, and the pressure equalization chamber 112 is formed by the piston 114 and the diaphragm plate 115. The pressure equalization chamber 112 is spatially arranged closer to the transfer gearset VS than the pressure chamber 111. When the pressure chamber 111 is filled with pressure medium to engage clutch A, the piston 114 moves axially, against the force of the restoring element 113, in the direction of the main gearset HS and so brings the disk set 100 of clutch A into frictional engagement.

A servomechanism 210 of the second shift element B is arranged at least largely radially over the hub section 223 of the input element ZYLAB, common to the two clutches A and B remote from the transfer gearset, at least partly within a cylindrical space formed by the disk carrier ZYLAB and in particular its cylindrical section 221. Thus, this servomechanism 210 always rotates at the speed of the output element of the transfer gearset VS, i.e., at the speed of the ring gear HO_VS, and comprises a pressure chamber 211 that can be filled with pressure medium, a pressure equalization chamber 212 that can be filled with unpressurized lubricant to offset a dynamic pressure of the rotating pressure chamber 211, a piston 214 mounted to move axially on the disk carrier ZYLAB to actuate the disk set 200 of clutch B, a diaphragm plate 215, and a restoring element 213 to restore the piston 214. The pressure chamber 211 is formed by a casing surface of the disk carrier ZYLAB and the piston mounted to move axially on the hub section 223, and the pressure equalization chamber 211 is formed by the piston 214 and the diaphragm plate 215. The pressure chamber 211 is spatially arranged closer to the transfer gearset VS than the pressure equalization chamber 212. Thus, the pressure chambers 111, 211 of the servomechanisms 110, 210 of the two clutches A, B are separated from one another only by a casing surface of the disk carrier ZYLAB common to the two clutches, in particular only by the disk-shaped pot bottom of the disk carrier ZYLAB. When the pressure chamber 211 of the servomechanism 210 is filled with pressure medium to engage the clutch B, the piston 214 moves against the force of the restoring element 213 axially in the direction opposite the transfer gearset VS and in the direction away from the main gearset HS, so bringing the disk set 200 of clutch B into frictional engagement. Thus, the actuation directions of the clutches A and B are opposite to one another.

As already mentioned, the hub of the disk carrier ZYLAB, common to the two clutches A, B with its two hub sections 123, 223, is mounted to rotate on the hub 623 of the input element 620 of clutch F. As also already mentioned, this hub 623 is mounted to rotate on the housing hub GN fixed to the transmission housing. The pressure medium and lubricant supply to the pressure chambers 111, 211 and the pressure equalization chambers 112, 212 of the servomechanisms 110, 210 of the two clutches A, B passes from this housing hub GN through the rotating hub 623 of the input element 620 of clutch F. For this purpose, corresponding holes or ducts are provided within the housing GN and the hub 623, as well as suitable sealing elements for a rotary seal, radially between the hub 623 and the two hub sections 123, 223 and axially between the respective radial holes and ducts for the pressure medium and lubricant supplies.

The output element 130 of clutch A is formed as an inner disk carrier, geometrically in the form of a pot, open in the direction away from the main gearset HS. A cylindrical section 131 of this inner disk carrier 130 has on its outer diameter a carrier profile to hold the inner disks of the disk set 100 of clutch A, preferably made as internally toothed lining disks, and extends starting from this disk set 100 axially toward the main gearset HS as far as just over the clutch E. On the side of this cylindrical section 131, close to the main gearset, a disk-shaped section 132 of the output element 130 of clutch A is connected to the cylindrical section 131 and extends radially inward as far as just above the carrier shaft 540, being connected, in a rotationally fixed manner, in its hub area to the second sun shaft 140. As already mentioned, this sun shaft 140 forms the kinematic connection between the clutch A and the second input element (here, the sun gear S2_HS) of the main gearset HS. In accordance with the spatial position of the disk set 100 of clutch A, shown in the example embodiment radially above the transfer gearset VS and, viewed in the direction of the main gearset HS, in front of the clutch E, the output element 130 of clutch A completely radially overlaps the clutch E in the axial direction.

The output element 230 of clutch B is also made as an inner disk carrier. A cylindrical section 231 of this inner disk carrier 230 has on its outer diameter a carrier profile to hold the inner disks of the disk sets 200 of clutch B, preferably made as internally toothed lining disks, and extends starting from this disk set 200 axially in the direction opposite the transfer gearset VS as far as just beyond the axial extension of the cylindrical section 221 of the (outer) disk carrier ZYLAB. On its side remote from the gearset this cylindrical section 231 is followed by a disk-shaped section 232 of the output element 230 of clutch B, which extends radially outward as far as a diameter between the outer diameter of the cylindrical section 221 of the disk carrier ZYLAB and the inside diameter of the cylindrical section 621 of the input element 620 of clutch F, located in this axial area. At its outer diameter this disk-shaped section 232 of the output element 230 of clutch B is connected, in a rotationally fixed manner, to a cylindrical section of the diaphragm plate 615 of the servomechanism 610 of clutch F. This diaphragm plate 615 of the servomechanism 610 of clutch F, besides its own function of forming the pressure equalization space for the servomechanism 610, has an additional function: namely, that of transmission of the output torque of clutch B to the first input element (sun gear S1_HS) of the main gearset HS. Correspondingly, the diaphragm plate 615 as a component, as well as a carrier profile between the diaphragm plate 615 and the hub 633, are dimensioned in such manner that they or it can transfer at least the maximum possible output torque of clutch B. In the example shown in FIG. 2, the diaphragm plate 615 is made as a pot, open in the direction of the transfer gearset VS with a large axial extension, whose pot bottom is connected, in a rotationally fixed manner, in the area of its inside diameter to the hub 633 of the output element 630 of clutch F and, in a section with a diameter radially above this hub 633, can move axially and is sealed against lubricant relative to the piston 614 of the servomechanism 610 of clutch F, to form the pressure equalization chamber 612 of the servomechanism 610. The cylindrical section of the diaphragm plate, coming after the pot bottom, is adapted to the outer contour of the clutch E and the outer disk carrier ZYLAB common to the clutches A and B, and completely radially overlaps the output element 130 of clutch A, the clutch E, the transfer gearset VS, the clutch A and the disk set 200 of clutch B. On the side of the disk set 200 of clutch B opposite the transfer gearset VS, the diaphragm plate is connected, in a rotationally fixed manner, to the output element 230 of clutch B made as an inner disk carrier. In the example embodiment shown, for this purpose a carrier profile is provided on the outer diameter of the disk-shaped section 232 of this output element 230, which engages in a corresponding carrier profile on the end of the diaphragm plate 615 remote from the main gearset. In another design of the connection between the output element of clutch B and the output element of clutch F, it can also be provided that the output element of clutch B is made as a cylinder with a large axial extension, connected on the clutch output side with the disk set of clutch B, completely radially overlapping the clutch A and the transfer gearset VS and the clutch E in the axial direction, and connected either directly or via the diaphragm plate of the servomechanism of clutch F, indirectly to the hub of the output element of clutch F.

Although the transmission design according to the invention shown in FIG. 2 comprises a drive output shaft AB co-axial with the drive input shaft AN, a person with knowledge of the subject will, if necessary, be able without any great effort to conceive an arrangement in which the drive input and drive output shafts are not arranged co-axially. Thus, the drive output shaft can simply be axis-parallel or at an angle to the output element of the main gearset (i.e., in this example axis-parallel or at an angle to the ring gear HO_HS of the main gearset HS), while maintaining the spatial position of all the other transmission components. Alternatively, the fourth shift element D, made as a brake, can then also be arranged on the side of the main gearset HS facing away from the transfer gearset VS in the area of an end wall of the transmission. Likewise, a person with knowledge of the subject can, if necessary, make the carrier shaft 540 shown as a solid shaft in FIG. 2, as a hollow shaft through which, to pass the drive input shaft AN centrally, if the drive motor of the transmission, in active connection with the drive input shaft AN, is intended to be arranged at the end of the transmission close to the main gearset.

Figure 3:
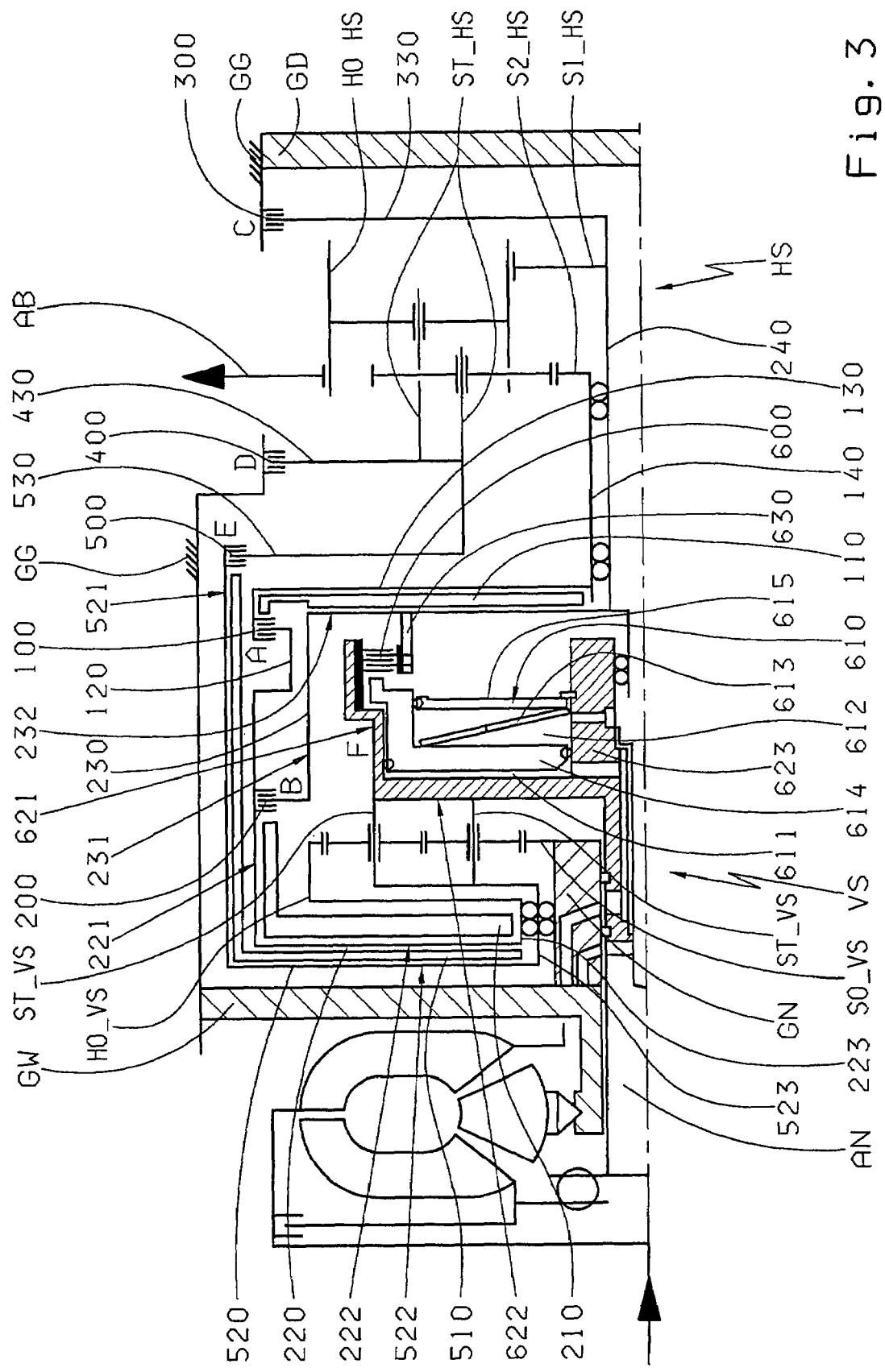
FIG. 3 is a second example embodiment of a transmission design according to the invention.

Referring to FIG. 3, a second example embodiment of a transmission design according to the present invention is explained below, here considering the example of a transmission whose drive input and drive output shafts are not co-axial with one another. The transfer gearset VS and the main gearset HS are arranged co-axially next to one another, but not directly adjacent. Viewed spatially, the sixth shift element F, made as a clutch, is arranged axially between the transfer gearset VS and the main gearset HS, axially directly adjacent the transfer gearset VS. Compared with the prior art, the main gearset HS is in a mirror image relationship relative to the transfer gearset VS. The first sun gear S1_HS of the main gearset HS, which again forms the first input element of this main gearset HS, is thus now spatially arranged on the side of the main gearset HS facing away from the transfer gearset VS, and the second sun gear S2_HS of the main gearset HS, which again forms the second input element of the main gearset HS, is thus now arranged closer to the transfer gearset VS than the first sun gear S1_HS of the main gearset HS.

In this case, the input element 620 of the clutch F is made as an outer disk carrier, geometrically in the form of a pot, open in the direction of the main gearset HS, with a hub 623, a disk-shaped section 622 and a cylindrical section 621. The drive input shaft AN and the hub 623 are, here for example, made as one piece; of course, however, a different suitable rotationally fixed connection can be provided between the hub 623 and the drive input shaft AN. The disk-shaped section 622 of the outer disk carrier 620 of clutch F extends in the radial direction parallel to the transfer gearset VS, starting from the hub 623 as far as a diameter corresponding approximately to the diameter of the ring gear HO_VS of the transfer gearset VS. Connected to this, the cylindrical section 621 of the inner disk carrier 620 of clutch F extends axially in the direction of the transfer gearset VS as far as over the disk set 600 of clutch F. Correspondingly, the cylindrical section 621 of the input element 620 of clutch F has on its inside diameter a carrier profile to hold the outer disks of the disk set 600, preferably made as externally toothed steel disks. The cylindrical section 621 of the input element 620 of clutch F is also connected with the coupled carrier ST_VS of the transfer gearset VS, and correspondingly this cylindrical section 621 can also be made as a carrier plate of the transfer gearset VS close to the main gearset.

The servomechanism 610 of clutch F is arranged within a coupling space, formed by the input element (outer disk carrier) 620 of the sixth shift element F, and always rotates at the speed of the drive input shaft AN. This servomechanism 610 comprises a pressure chamber 611, that can be filled with pressure medium, a pressure equalization chamber 612, that can be filled with unpressurized lubricant to offset a dynamic pressure of the rotating pressure chamber 611, a piston 614 mounted to move axially on the hub 623 to actuate the disk set 600 of the clutch F, a restoring element 613, here made for example as a cup spring axially fixed on the hub 623 to restore the piston 614, and a diaphragm plate 615, axially fixed on the hub 623. The pressure chamber 611 is formed by a casing surface of the outer disk carrier 620 of clutch F and the piston 614, and the pressure equalization chamber 612 is formed by the piston 614 and the diaphragm plate 615. Thus, the pressure chamber 611 is arranged closer to the transfer gearset VS than the pressure equalization chamber 612, i.e., the pressure equalization chamber 612 is arranged closer to the main gearset HS than the pressure chamber 611. When the pressure chamber 611 is pressurized with pressure medium to engage clutch F, the piston 614 moves against the spring force of the restoring element 613, axially in the direction of the main gearset HS, and so actuates the disk set 600 of clutch F associated with it. The pressure medium supply to the pressure chamber 611 of the servomechanism 610 of clutch F and the lubricant supply to the pressure equalization chamber 612 provided for dynamic pressure compensation of the servomechanism 610 of clutch F, pass partly within the hub 623 of the input element (outer disk carrier) 620 of clutch F and partly within the drive input shaft AN.

The output element 630 of clutch F is made as an inner disk carrier to hold the inner disks of the disk set 600 of clutch F preferably made as internally toothed lining disks. Viewed in the direction of the main gearset HS, this inner disk carrier 630 is positioned after the servomechanism 610 of the clutch F and is coupled centrally to a first sun shaft 240, which forms the connection between the output element 630 of clutch F and the first sun gear S1_HS of the main gearset HS.

The first shift element A, made as a clutch, is spatially arranged in an area at least partly axially between the clutch F and the main gearset HS. In particular, a servomechanism 110 of this clutch A—here shown only schematically for the sake of simplicity—is spatially arranged in an area axially between the clutch F and the main gearset, axially adjacent the output element 630 of the clutch F. This servomechanism 110 is at least largely arranged within a cylindrical space formed by the output element 130 of clutch A, here formed as an outer disk carrier, mounted to move axially on this outer disk carrier 130 of clutch A and so to actuate the disk set 100 associated with it axially in the direction of the transfer gearset VS in order to engage the clutch A. This outer disk carrier 130 of clutch A is here made in the form of a cylindrical pot open in the direction of the transfer gearset VS, which is in rotationally fixed connection, in its hub area, via a second sun shaft 140, with the second sun gear S2_HS of the main gearset HS. The second sun shaft 140 is made as a hollow shaft which encloses the first sun shaft 240 radially and is mounted to rotate on the first sun shaft 240. Correspondingly, the servomechanism 110 of clutch A always rotates at the speed of the second input element of the main gearset HS.

The disk set 100 of clutch A is spatially arranged in an area radially above the clutch F, in the example embodiment shown approximately next to the disk set 600 of clutch F in the axial direction. Depending on the dimensioning of the shift elements in relation to their torque transmission capacity, the corresponding disk sets will be of greater or lesser structural length in the transmission. Accordingly, it can also be provided that the disk set 100 of clutch A is spatially arranged at least partly in an area radially over the disk set 600 of clutch F.

The input element 120 of clutch A is made as an inner disk carrier, geometrically largely in the form of a cylindrical ring which extends, starting from the disk set 100 of clutch A, axially in the direction of the transfer gearset VS as far as the disk set 200 of the second shift element B, made as a clutch, and thereby partially overlapping the clutch F in the axial direction. Spatially, this disk set 200 of clutch B is arranged in an area approximately radially over the carrier plate of the transfer gearset VS near the main gearset. In this spatial area within the transmission housing GG, the input element 120 of clutch A is connected, in a rotationally fixed manner, to the output element 220 of clutch B, made as an outer disk carrier.

Viewed axially in the direction of the main gearset HS, the disk set 500 of the fifth shift element E, made as a clutch, is axially adjacent the disk set 100 of clutch A. The disk set 500 of clutch E is thus arranged in an area between the transfer gearset VS and the main gearset HS. A servomechanism 510 of this clutch E for actuating its disk set 500, illustrated only schematically for the sake of simplicity, is however arranged mainly on the other side of the transfer gearset VS, i.e., on the side of the transfer gearset VS opposite the main gearset HS. In particular, a pressure chamber (not indexed) of this servomechanism 510 is arranged on the side of the transfer gearset VS facing away from the main gearset HS and always rotates with the speed of the drive input shaft AN. Correspondingly, the servomechanism 510 comprises a piston which acts on this set 500 or at least an actuation finger in active connection with the piston, which completely radially overlaps both the transfer gearset VS and the clutches B and A in the axial direction.

In the example embodiment shown, the input element 520 of clutch E is made as an outer disk carrier, geometrically in the form of a pot, open toward the main gearset, with a hub 523, a disk-shaped section 522 and a cylindrical section 521. The hub 523 of the outer disk carrier 520 of clutch E is arranged on the side of the transfer gearset VS facing away from the main gearset HS, and is mounted to rotate on a hub GN, fixed on the transmission housing, by way of which the sun gear SO_VS of the transfer gearset VS is fixed onto the transmission housing GG, and in rotationally fixed connection with the drive input shaft AN, via a passage, passing axially through the transfer gearset VS. Starting from the side of the hub 523 remote from the transfer gearset, the disk-shaped section 522 of the outer disk carrier 520 of clutch E is connected to the hub 523 and extends radially outward as far as just under the inside diameter of the transmission housing GG. To the outer diameter of the disk-shaped section 522 is connected the cylindrical section 521 of the outer disk carrier 520 of clutch E of the disk-shaped section 522, and which extends axially far in the direction of the main gearset HS as far as the disk set 500 of clutch E, thereby completely radially overlapping both the transfer gearset VS and the clutches B, F and A in the axial direction. Correspondingly, a carrier profile is provided on the inside diameter of the cylindrical section 521 to hold the outer disks of the disk set 500 of clutch E, preferably made as externally toothed steel disks.

The servomechanism 510 of clutch E is arranged completely within the cylindrical space formed by the outer disk carrier 520 of clutch E described. The pressure medium supply to the pressure chamber of the servomechanism 510 of clutch E and—if dynamic pressure compensation for the rotating pressure chamber of the servomechanism 510 is provided—the lubricant supply to a pressure equalization chamber that can be filled with unpressurized lubricant for this dynamic pressure compensation of the servomechanism 510 of clutch E, pass partly within the hub 523 of the input element 520 of clutch E and partly within the hub GN fixed on the transmission housing.

In the example embodiment shown, the output element 530 of clutch E is made as an inner disk carrier with a carrier profile on its outer diameter to hold inner disks of the disk set 500 of clutch E, preferably made as internally toothed lining disks. This inner disk carrier 530 is spatially arranged axially between the output element 130 of clutch A and the main gearset HS, and is connected, in a rotationally fixed manner, on the side of the main gearset HS facing toward the transfer gearset VS, to the coupled carrier ST_HS of the main gearset HS. As is known, this carrier ST_HS forms the third input element of the main gearset HS.

The second shift element B formed as a clutch is arranged completely within a cylindrical space formed by the output element 520 of clutch E in this case made as an outer disk carrier. An input element 220 of this clutch B, connected to the output element—i.e., here the ring gear HO_VS—of the transfer gearset VS, is made as an outer disk carrier, geometrically in the form of a pot open in the direction of the main gearset HS, with a hub 223, a disk-shaped section 222 and a cylindrical section 221. The hub 223 is spatially arranged on the side of the transfer gearset VS facing away from the main gearset HS, connected to the ring gear HO_VS of the transfer gearset VS on its side close to the transfer gearset by way of a disk-shaped element, and mounted to rotate on the hub 523 of the input element 520 of clutch E. On the side of the hub 223 remote from the transfer gearset, the disk-shaped section 222 of the outer disk carrier 220 of clutch B is connected to the hub 223 and extends adjacent the servomechanism 510 of clutch E and largely parallel to the disk-shaped section 522 of the input element 520 of clutch E, radially outward as far as a diameter larger than the outer diameter of the transfer gearset VS, but smaller than the inside diameter of the actuation finger of the servomechanism 510 of clutch E, which acts on the disk set 500 of clutch E. At the outer diameter of the disk-shaped section 222, the cylindrical section 221 of the outer disk carrier 220 of clutch B is connected to the disk-shaped section 222 and extends axially in the direction of the main gearset HS as far as the disk set 200 of clutch B. This disk set 200 is spatially arranged in an area at least partly radially over the transfer gearset VS and at least partly radially over the clutch F directly adjacent the transfer gearset VS. On its inside diameter the cylindrical section 221 of the outer disk carrier 220 of clutch B has a carrier profile to hold outer disks of the disk set 200 of clutch B preferably made as externally toothed steel disks.

The servomechanism 210 of clutch B, shown only schematically for the sake of simplicity, is arranged completely within a cylindrical space formed by the input element (outer disk carrier) 220 of clutch B, and also mounted to move on this outer disk carrier 220. Since this servomechanism 210 always rotates at the speed of the output element of the transfer gearset VS, it can also expediently incorporate dynamic pressure offset to compensate a rotational pressure of its pressure chamber. The pressure medium supply to the pressure chamber of the servomechanism 210 of clutch B and—if dynamic pressure compensation is provided—a lubricant supply to a pressure equalization chamber of the servomechanism 210 of clutch B that can be filled with unpressurized lubricant, pass partly within the hub 223 of the input element 220 of clutch B and partly within the hub 523 of the input element 520 of clutch E and partly within the hub GN fixed on the transmission housing, on which, as described, the hub 523 is mounted to rotate. When clutch B is engaged, the servomechanism 210 actuates the disk set 200 of clutch B associated with it, axially in the direction of the main gearset HS.

An output element 230 of clutch B, connected to the first input element of the main gearset HS, is correspondingly made as an inner disk carrier, geometrically in the form of a pot open toward the transfer gearset VS, with a cylindrical section 231 and a disk-shaped section 232. On its outer diameter the cylindrical section 231 has a carrier profile to hold inner disks of the disk set 200 of clutch B preferably made as internally toothed lining disks, and extends starting from this disk set 200 axially in the direction of the main gearset HS, thereby completely radially overlapping the clutch F in the axial direction. The disk-shaped section 232 forms the pot bottom of the inner disk carrier 230 of clutch B connected to the cylindrical section 231 and is spatially arranged axially directly next to the clutch F on its side close to the main gearset, being connected, in a rotationally fixed manner, to the output element (inner disk carrier) 630 of clutch F and to the first sun shaft 240 that extends centrally.

As already mentioned, the input element 120 of clutch A made as an inner disk carrier is connected by way of the input element 220 of clutch B to the output element—i.e., here the ring gear HO_VS—of the transfer gearset VS. This cylindrical-ring-shaped inner disk carrier 120 of clutch A extends spatially in the axial direction radially between the cylindrical section 231 of the output element 230 of clutch B and the cylindrical section 521 of the input element 520 of clutch E. In turn, this cylindrical section 231 of the output element 230 of clutch B extends spatially in the axial direction, at least mainly radially between the cylindrical section 621 of the input element 620 of clutch F or the outer diameter of clutch F and the input element 120 of clutch A.

In accordance with the design and spatial arrangement of the output element 530 of clutch E, the fourth shift element D, here for example, made as a disk brake, by way of which, as is known, the coupled carrier ST_HS or third input element of the main gearset HS can be fixed relative to the transmission housing GG, is arranged directly adjacent the main gearset HS. The disk set 400 of this brake D, viewed in the direction of the main gearset HS, is axially adjacent the disk set 500 of clutch E, so that the disk sets 500 and 400 are arranged close to one another. A servomechanism to actuate the disk set 400 is not explicitly shown for the sake of simplicity, and can for example be integrated in the transmission housing GG or in an outer disk carrier of the brake D fixed to the transmission housing. In the example embodiment shown, the output element 430 of brake D made as an inner disk carrier is coupled directly to the carrier ST_HS of the main gearset HS, so that the corresponding carrier plate of this carrier ST_HS close to the transfer gearset and the inner disk carrier 430 of brake D can also be made as one piece. In a different design, the output element 430 of brake D could also be connected to the carrier ST_HS by the output element 530 of clutch E, or the output element 530 of clutch E by the output element 430 of brake D.

As already mentioned, the drive input shaft AN and the drive output shaft AB are not co-axial with one another. Accordingly, the third shift element C, made as a brake, can simply be arranged on the side of the main gearset HS facing away from the transfer gearset VS, axially adjacent a housing cover GD, fixed on the transmission housing, which at the same time forms an end of the transmission—in the example embodiment shown, the end opposite the transmission drive. A servomechanism, not shown for the sake of simplicity, for actuating the disk set 300 of brake C can for example be integrated in this housing cover GD in a simply designed manner. The output element 330 of brake C, made as an inner disk carrier, extends in the radial direction largely parallel to the main gearset HS, and at its inside diameter is either connected, in a rotationally fixed manner, directly to the first sun gear S1_HS of the main gearset HS, or to the first sun shaft 240 when the latter passes through the first sun gear S1_HS of the main gearset HS in the axial direction.

For a person with knowledge of the subject, it is easy to see that the spatial position of the drive input side of the transmission on the side of the transfer gearset VS opposite the main gearset HS, illustrated in FIG. 3, is to be understood as an example. If necessary, such a person could make the first sun shaft 240 as a hollow shaft and, without great effort, also arrange for the drive input to the transmission to be on the side of the main gearset HS opposite the transfer gearset VS.

It is also clear to those with knowledge of the field, that the component arrangements according to the invention shown in FIGS. 2 and 3 can also be adapted without problems to other designs of the main gearset HS. The prerequisite is only to maintain the kinematic coupling of the output element of the main gearset HS to the drive output shaft AB, and to maintain the kinematic coupling of the at least three input elements of the main gearset HS to the sixth shift elements A to F (and also to maintain the kinematic coupling of the at least three input elements of the main gearset HS, via these six shift elements A to F to the drive input shaft AN and the transfer gearset VS), so that a speed diagram of the automatic transmission remains at least essentially unchanged. In addition, the "new" main gearset in combination with the transfer gearset VS and the six shift elements A to F should enable appropriate and realizable speed steps. Accordingly, the design of the main gearset HS in FIGS. 2 and 3 as a two-carrier, four-shaft planetary transmission with the structural form of a Ravigneaux planetary gearset with two sun gears and a ring gear, should be regarded only as an example.

Thus, referring to FIG. 4 below, a third example embodiment of a transmission design according to the present invention is explained, which is based on the transmission design described above with reference to FIG. 3, but with a main gearset HS of different design. In contrast to FIG. 3, the "new" main gearset HS is now formed of two mutually coupled individual planetary gearsets, the first of which also comprises a "divided sun gear". In terms of its structure, the "new" main gearset HS is a "three-carrier, five-shaft planetary transmission reduced to a two-carrier unit" with four input elements, not connected with one another, and one output element.

This main gearset HS comprises a coupled first ring gear H13_HS, a second ring gear H2_HS, three sun gears S1_HS, S2_HS and S3_HS, a coupled first carrier ST13_HS with long planetary gears P13_HS mounted to rotate on it, and a second carrier ST2_HS with short planetary gears P2_HS mounted to rotate on it. The coupled ring gear H13_HS, the coupled carrier ST13_HS with its long planetary gears P13_HS, the first sun gear S1_HS and the third sun gear S3_HS are associated with the first of the two individual planetary gearsets of the main gearset HS. The first and third sun gears S1_HS, S3_HS of the main gearset HS thus form the "divided sun gear" of this first planetary gearset of the main gearset HS. The long planetary gears P13_HS mesh with the first ring gear H13_HS, the first sun gear S1_HS and the third sun gear S3_HS. The second ring gear H2_HS, the second sun gear S2_HS and the second carrier ST2_HS with its short planetary gears P2_HS are associated with the second of the two individual planetary gearsets of the main gearset HS, such that the short planetary gears P2_HS mesh with the second ring gear H2_HS and the second sun gear S2_HS. In the example embodiment shown, the long planetary gears P13_HS are not made as stepped planetaries, so the two sun gears S1_HS and S3_HS of the main gearset HS in this case have identical numbers of teeth. Spatially, the third sun gear S3_HS of the main gearset HS is arranged axially between the first and second sun gears S1_HS, S2_HS of the main gearset HS, in this case, with the first sun gear S1_HS arranged closer to the transfer gearset VS than the second sun gear S2_HS of the main gearset HS.

The first sun gear S1_HS forms the first input element of the main gearset HS and is connected with the output element 230 of the second shift element B made as a clutch and with the output element 630 of the sixth shift element F also made as a clutch. The first ring gear H13_HS of the main gearset HS forms the second input element of the main gearset HS and is connected with the output element 130 of the first shift element A. The second carrier ST2_HS of the main gearset HS forms the third input element of the main gearset HS and is connected to the output element 530 of the fifth shift element E made as a clutch, and the output element 430 of the fourth shift element D made as a brake. The fourth input element of the main gearset HS is formed by the sun gears S2_HS and S3_HS permanently connected with one another, which are also connected to the output element 330 of the third shift element C, made as a brake. The second ring gear H2_HS and the coupled first carrier ST13_HS are permanently connected with one another and form the output element of the main gearset HS connected to the drive output shaft AB. In a speed diagram of the automatic transmission according to FIG. 4, the lines of the first and fourth input elements of the main gearset HS coincide in accordance with the component and kinematic coupling of the three sun gears S1_HS, S2_HS and S3_HS described.

To connect the output element of the main gearset HS to the drive output shaft AB, the first individual planetary gearset of the main gearset HS comprises a carrier plate facing toward the transfer gearset VS and connected to the coupled first carrier ST13_HS, which extends in the radial direction inward axially between the first and third sun gears S1_HS, S3_HS of the main gearset HS and is centrally connected to the drive output shaft AB. The drive output shaft AB passes through the second and third sun gears S2_HS, S3_HS of the main gearset HS in the axial direction. Of course, in a different design of the connection of the drive output shaft AB to the output element of the main gearset HS, it can also be provided that the carrier plate of the coupled carrier ST13_HS has in its hub area a cylindrical hub with a large axial extension, which then passes centrally through the second and third sun gears S2_HS, S3_HS of the main gearset HS and is connected to the drive output shaft AB only on the side of the main gearset HS facing away from the transfer gearset VS.

Figure 4:
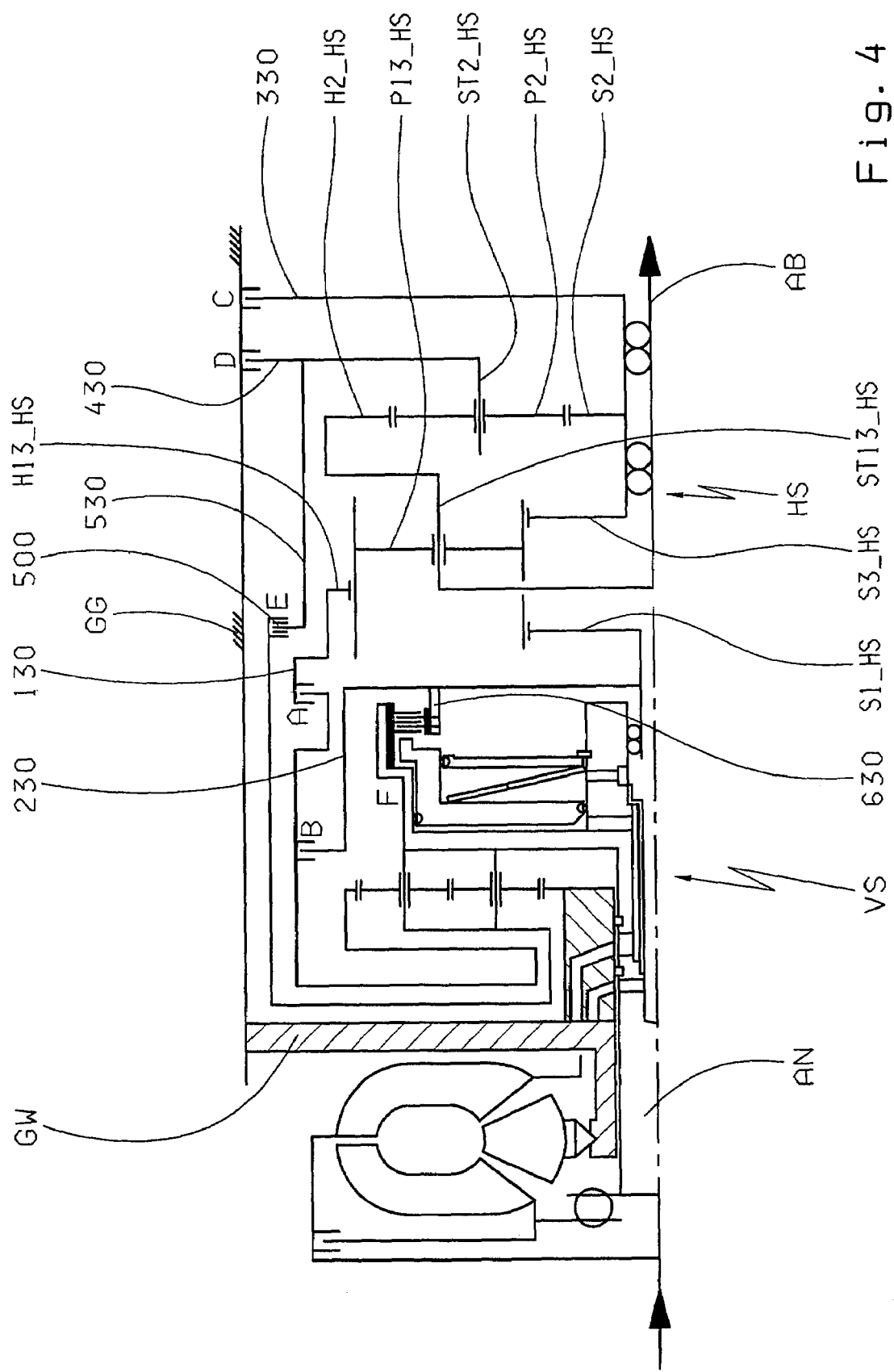
FIG. 4 is a third example embodiment of a transmission design according to the invention, based on the transmission shown in FIG. 3, but with an alternative main gearset.

As can also be seen in FIG. 4, in contrast to FIG. 2, the clutch E and the brake D are now connected to the second carrier ST2_HS of the main gearset HS on the side of the latter facing away from the transfer gearset VS. The disk set 500 of clutch E is arranged, for example, in an area radially over the first individual planetary gearset of the main gearset HS. Correspondingly, the output element 530 of clutch E overlaps the main gearset HS at least partly in the axial direction. In a manner favorable from the standpoint of production technology, the brake D is now arranged directly adjacent the brake C on the side of the main gearset HS facing away from the transfer gearset, so that the frictional element of brake D, arranged axially next to the second individual planetary gearset of the main gearset HS in the example shown, can also be spatially arranged in an area radially over the main gearset HS.

Since the spatial arrangement and design of the other transmission components in FIG. 4 are the same as in FIG. 2, they need not be described in detail again here. It should be mentioned, however, that the shift logic shown in FIG. 1B to make clear the forward and reverse gears also applies to the third example embodiment of the transmission according to the present invention illustrated in FIG. 4.

Figure 5:
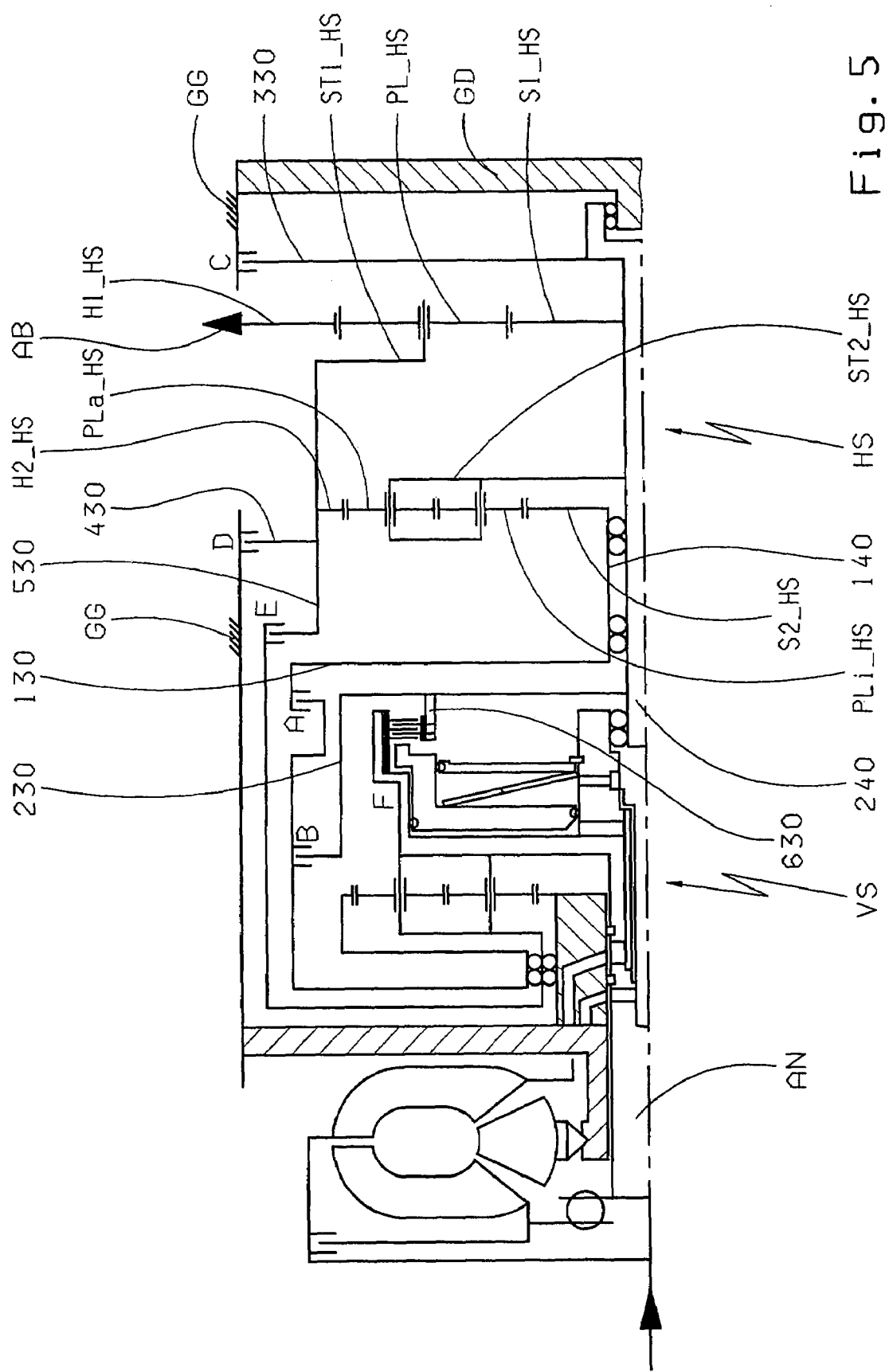
FIG. 5 is a fourth example embodiment of a transmission design according to the invention, based on the transmission shown in FIG. 3, but with an alternative main gearset.

Referring to FIG. 5, a fourth example embodiment of a transmission design according to the present invention will now be explained, again based on the transmission design described earlier with reference to FIG. 3, but with a main gearset HS of different design. The transfer gearset VS and main gearset HS are again arranged co-axially next to one another, but not directly adjacent. As in FIG. 3, the drive input and drive output shafts AN, AB of the transmission are not co-axial. In contrast to FIG. 3, the "new" main gearset HS is now formed of two mutually coupled individual planetary gearsets, the first of these two individual planetary gearsets formed as a "negative planetary gearset" of simple planetary structure and the second of the two individual planetary gearsets as a "positive planetary gearset" with a double planetary structure, and the second individual planetary gearset of the main gearset HS is arranged closer to the transfer gearset VS than the first individual planetary gearset of the main gearset HS. Thus, in terms of its structural form the "new" planetary gearset HS is a two-carrier, four-shaft planetary transmission.

The first individual planetary gearset of the main gearset HS comprises a sun gear S1_HS, a ring gear H1_HS and a carrier ST1_HS on which planetary gears PL_HS are mounted to rotate, which mesh with the sun gear S1_HS and the ring gear H1_HS. The second individual planetary gearset of the main gearset HS comprises a sun gear S2_HS, a ring gear H2_HS and a coupled carrier ST2_HS on which inner and outer planetary gears PLi_HS, PLa_HS are mounted, these inner planetary gears PLi_HS meshing with the outer planetary gears PLa_HS and the sun gear S2_HS, and with the outer planetary gears PLa_HS meshing with the inner planetary gears PLi_HS and the ring gear H2_HS.

The (first) sun gear S1_HS and the coupled (second) carrier ST2_HS of the main gearset HS are permanently connected with one another and form the first input element of the main gearset HS, which is connected on the one hand (on the side of the main gearset HS facing away from the transfer gearset VS) to the output element 330 of the brake C, and on the other hand, via the first sun shaft 240 (on the side of the main gearset HS facing toward the transfer gearset VS) to the output element 630 of the clutch F and the output element 230 of the clutch B. The (second) sun gear S2_HS of the main gearset HS faces toward the transfer gearset VS and forms the second input element of the main gearset HS, which is connected by way of the sun shaft 140 to the output element 130 of the clutch A. The (first) carrier ST1_HS and the (second) ring gear H2_HS of the main gearset HS are permanently connected with one another to form the third input element of the main gearset HS, which is connected with the output element 530 of clutch E and the output element 430 of brake D. In the example embodiment shown, the clutch E and the brake D are arranged on the side of the main gearset HS facing the transfer gearset VS; in another version, however, in particular the brake D can be spatially arranged at least partly in an area radially over the second ring gear H2_HS of the main gearset HS. The (first) ring gear H1_HS of the main gearset HS forms its output element and is permanently connected to the drive output shaft AB of the transmission.

Again with a main gearset HS constructed in this way, in combination with the transfer gearset VS made as a positive planetary gearset in double planetary structure and the kinematic coupling of the individual input and output elements of the main and transfer gearsets HS, VS to the sixth shift elements A to F and the drive input and drive output shafts AN, AB the same as that shown in FIG. 3, a total of eight forward gears can be engaged without range change, and with the same shift logic shown in FIG. 1B.

Since the spatial arrangement and design of the other transmission component in FIG. 5 are the same as in FIG. 3, they need not be described again in detail here.

Figure 6:
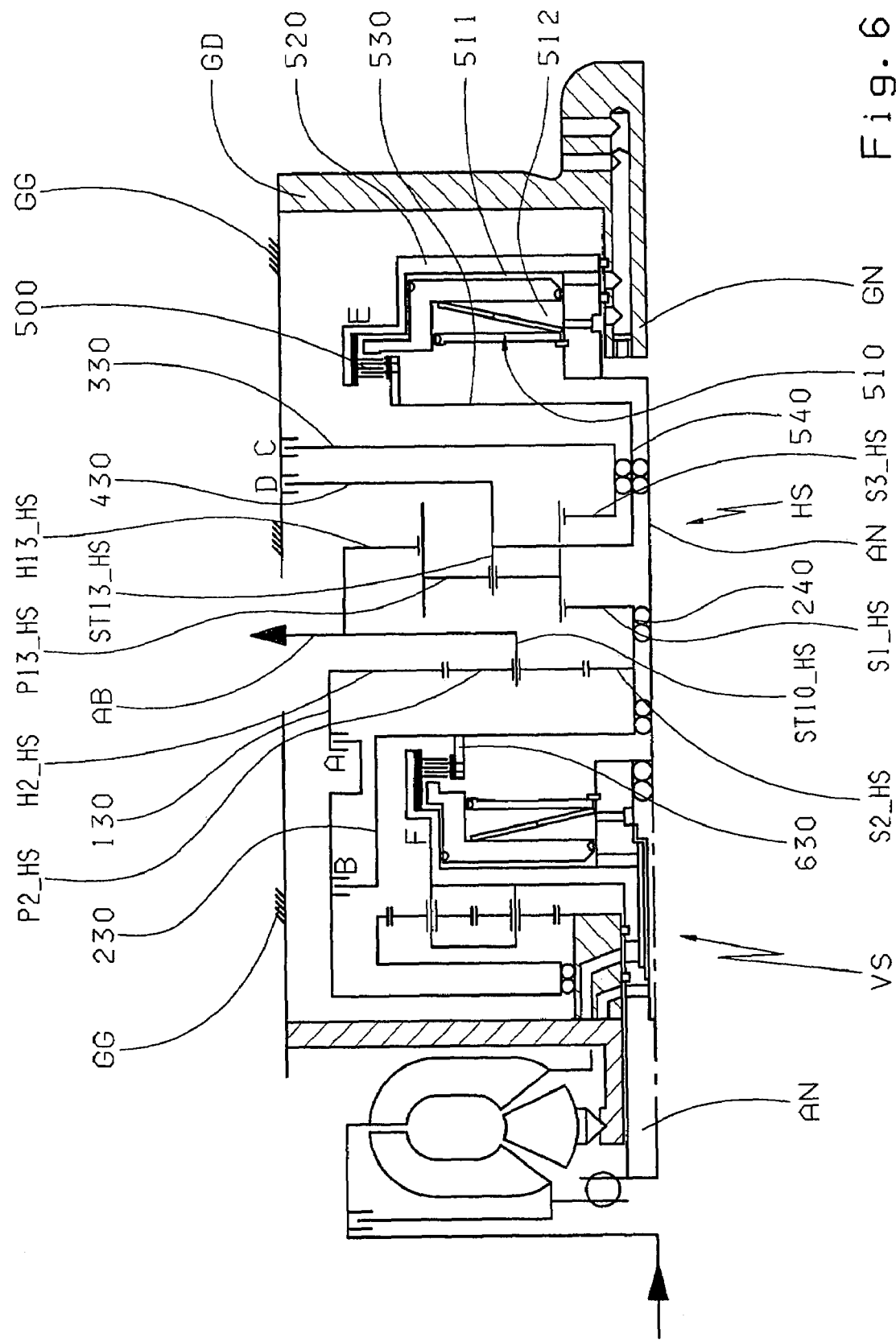
FIG. 6 is a fifth example embodiment of a transmission design according to the invention, based on the transmission shown in FIG. 4, but with an alternative shift element arrangement.

Referring to FIG. 6, a fifth example embodiment of a transmission design according to the present invention will now be explained, which is based on the transmission design described above with reference to FIG. 4, but with an alternative arrangement of the fifth element E, specially designed for a transmission with a non-co-axial arrangement of the drive input and drive output shafts AN, AB. The transfer gearset VS, made as a simple positive planetary gearset and the main gearset HS, made as a "three-carrier, five-shaft planetary transmission reduced to a two-carrier unit", are arranged co-axially next to one another and co-axially with the drive input shaft AN. The main gearset HS has four input elements not connected with one another and one output element, and is formed of two mutually coupled individual planetary gearsets, one of these two individual planetary gearsets comprising a "divided sun gear". Correspondingly, the main gearset HS comprises three sun gears S1_HS, S2_HS, S3_HS, a coupled first ring gear H13_HS, a second ring gear H2_HS, a coupled first carrier ST13_HS with long planetary gears P13_HS mounted to rotate on it, and a second carrier ST2_HS with short planetary gears P2_HS mounted to rotate on it.

In accordance with the nomenclature of the connection of the input elements of the main gearset HS to the various shift elements A to F, the second of the two individual planetary gearsets of the main gearset HS is arranged close to the transfer gearset and comprises the second sun gear S2_HS, the second ring gear H2_HS and the second carrier ST2_HS with the short planetary gears P2_HS mounted to rotate on it. Correspondingly, the first individual planetary gearset of the main gearset HS remote from the transfer gearset comprises the first and third sun gears S1_HS, S3_HS, the coupled ring gear H13_HS and the coupled carrier ST13_HS with the long planetary gears P13_HS mounted to rotate on it. The short planetary gears P2_HS mesh with the second ring gear H2_HS and the second sun gear S2_HS, and the long planetary gears P13_HS mesh with the coupled ring gear H13_HS and the first and third sun gears S1_HS, S3_HS. In the example embodiment illustrated, the long planetary gears P13_HS are not made as stepped planetaries, so the two sun gears S1_HS and S3_HS of the main gearset HS have identical numbers of teeth. The first sun gear S1_HS of the main gearset HS is spatially arranged axially between the second and the third sun gears S2_HS, S3_HS of the main gearset HS, with this second sun gear S2_HS arranged closer to the transfer gearset VS than the third sun gear S3_HS.

The first and second sun gears S1_HS, S2_HS are permanently connected with one another and form the first input element of the main gearset HS, which is connected, in a rotationally fixed manner, to the output element 230, 630 of the clutches B and F on the side of the main gearset HS close to the transfer gearset. The second ring gear H2_HS forms the second input element of the main gearset HS and is connected, in a rotationally fixed manner, to the output element 130 of clutch A. The coupled carrier ST13_HS forms the third input element of the main gearset HS and—in correspondence with the spatial position of the brake D and the clutch E—is connected, in a rotationally fixed manner, on the side of the main gearset HS facing away from the transfer gearset VS to the output element 430 of the brake D and to the output element 530 of the clutch E. The third sun gear S3_HS forms the fourth input element of the main gearset HS and—in correspondence with the spatial position of brake C—is connected, in a rotationally fixed manner, on the side of the main gearset HS facing away from the transfer gearset VS to the output element 330 of brake C. The coupled ring gear H13_HS and the second carrier ST2_HS are permanently connected with one another and form the output element of the main gearset HS connected to the drive output shaft AB of the transmission. In a speed diagram of the automatic transmission according to FIG. 6, the lines of the first and fourth input elements of the main gearset HS coincide in accordance with the component arrangement and kinematic coupling of its three sun gears S1_HS, S2_HS, S3_HS described.

For the kinematic connection of the third input element of the main gearset HS to the output element 530 of clutch E, the sun gear of the second individual planetary gearset of the main gearset HS is divided into the two sun gears S1_HS and S3_HS. The coupled carrier ST13_HS of the main gearset HS comprises a carrier plate connected with the output element 530 of clutch E, which extends radially inward axially between the first and the third sun gears S1_HS, S3_HS of the main gearset HS. A hub of the output element 530 of clutch E connected to this carrier plate, or a hub shaft 540 connected, in a rotationally fixed manner, to this carrier plate and the output element 530, passes in the axial direction centrally through the third sun gear S3_HS of the main gearset HS (remote from the transfer gearset).

The clutch E is now arranged completely on the side of the main gearset HS facing away from the transfer gearset VS. On its side near the main gearset, the clutch E is adjacent the brake C and its output element (inner disk carrier) 330. On its side remote from the main gearset, the clutch E is adjacent to an outer end wall of the transmission housing GG, in this case for example, formed as a housing cover GD fixed onto the transmission housing. The input element 520 of clutch E connected to the drive input shaft AN is, here for example, made as an outer disk carrier, geometrically in the form of a pot, open in the direction of the main gearset HS, which is mounted to rotate on a hub GN fixed to the transmission housing and extending, starting from the outer wall, axially inward into the transmission. The servomechanism 510 of clutch E, for actuating the disk set 500 associated with it, is arranged completely inside a cylindrical space formed by this outer disk carrier 520. In a correspondingly simple manner, the pressure medium supply to the pressure chamber 511 of the servomechanism 510 of clutch E and the lubricant supply to the pressure equalization chamber 512 which can be filled with unpressurized lubricant for the dynamic pressure compensation of the servomechanism 510 of clutch E, can pass partly within a hub of the input element 520 of clutch E and partly within the hub GN fixed on the transmission housing. When the clutch E is engaged, the servomechanism 510 actuates the disk set 500 of clutch E axially in the direction of the main gearset HS.

The component arrangement shown in FIG. 6 enables the transmission output to pass, via a spur gear or bevel gear stage (not shown), kinematically connected spatially approximately half way along the axial length of the transmission to the main gearset HS. In the example embodiment shown in FIG. 6, a drive motor of the transmission (not shown), in active connection with the drive input shaft AN, is arranged on the side of the transfer gearset VS facing away from the main gearset HS. Correspondingly, the clutch E is in this case arranged at the end of the transmission housing away from the drive motor. Thus, the drive input shaft AN passes through almost the entire transmission in the axial direction, at least through all the gearsets VS, HS. Accordingly, there would be no particular design difficulty in arranging the drive motor at the other end of the transmission, adjacent the clutch E.

As already indicated in the context of the description of FIGS. 4 and 6, the division of a central gear (i.e., a sun or ring gear) of an individual planetary gearset into two separate central gears not only provides an additional degree of freedom in relation to component coupling to this originally undivided central gear, but also an additional degree of freedom in relation to the speed diagram of the transmission. This will now be explained in more detail with reference to another, sixth example embodiment of a transmission design according to the present invention, which is illustrated in FIG. 7. This sixth example embodiment is based on the transmission design previously described in FIG. 6, but with an alternative design of the main gearset HS.

Figure 7A:
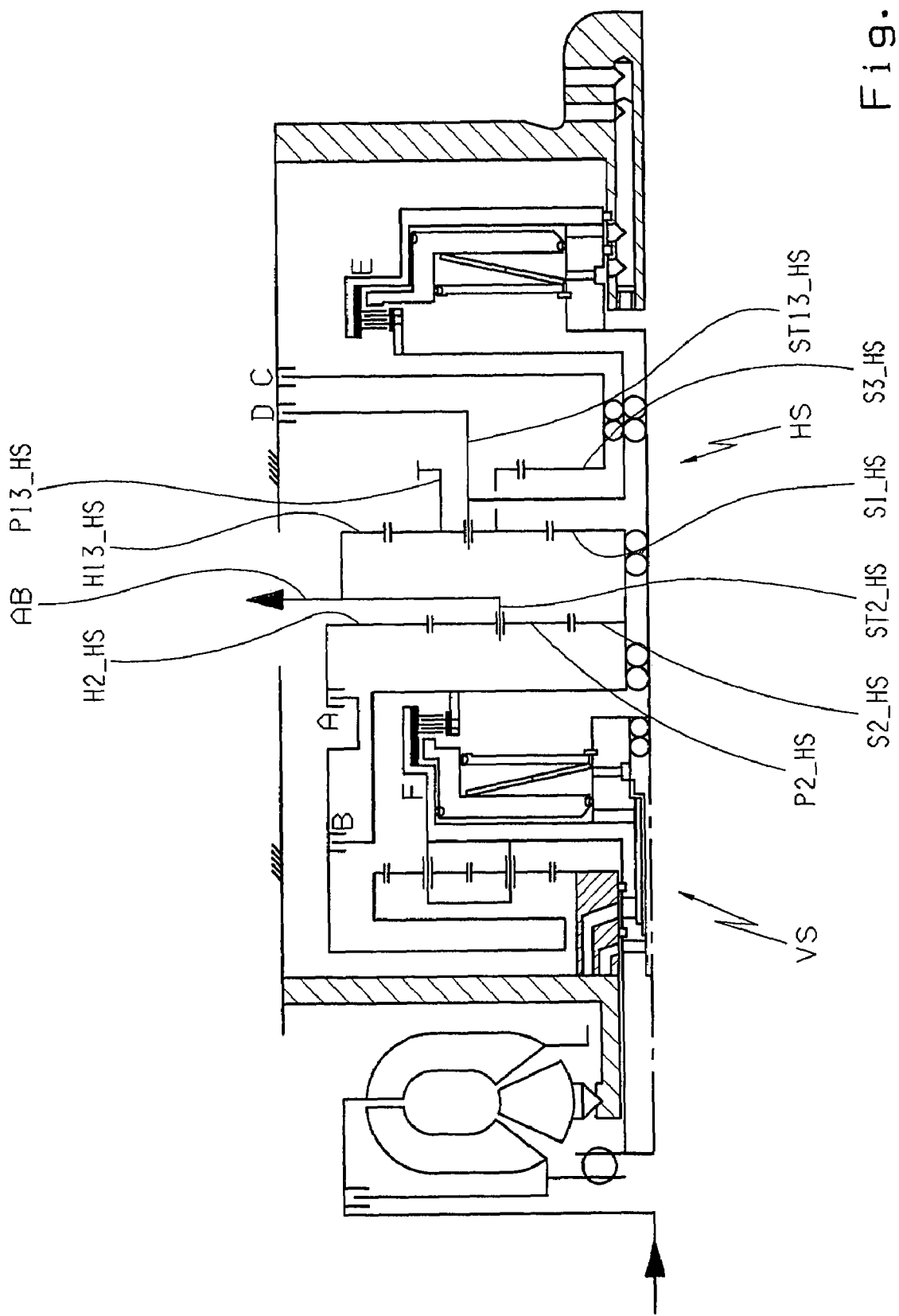
FIG. 7A is a sixth example embodiment of a transmission design according to the invention, but with a design of the main gearset modified compared with FIG. 6.

As can be seen in FIG. 7A, in this sixth example embodiment the spatial component arrangement and the kinematic coupling of the planetary gearsets VS and HS, the six shift elements A to F, and the drive input and drive output shafts AN, AB, are entirely the same as in the fifth example embodiment previously described in detail with reference to FIG. 6. As in FIG. 6, the "new" main gearset HS is made as a "three-carrier, five-shaft planetary transmission reduced to a two-carrier unit", with four input elements not connected with one another and one output element, and with three individual planetary gearsets, two of them combined into a single-carrier unit with a coupled carrier ST13_HS and a common ring gear H13_HS, and with separate sun gears S1_HS, S3_HS. In contrast to FIG. 6, the long planetary gears P13_HS of the main gearset HS, mounted to rotate on the coupled carrier ST13_HS, are now formed as stepped planetaries with different numbers of teeth to match the two sun gears S1_HS and S3_HS of the main gearset HS. Correspondingly, the first and third sun gears S1_HS, S3_HS of the main gearset now have different numbers of teeth. For example, the coupled ring gear H13_HS of the main gearset HS meshes with the equal number of teeth on the long planetary gears P13_HS of the main gearset HS, with which the first sun gear S1_HS of the main gearset HS also meshes. Of course, in a different design it could also be provided that the coupled ring gear H13_HS of the main gearset meshes with the equal number of teeth on the long planetary gears P13_HS of the main gearset, with which the third sun gear S3_HS of the main gearset also meshes. The essential feature is that in a speed diagram of this automatic transmission according to FIG. 7A, the lines corresponding to the fourth input element and the first input element of the main gearset HS now no longer coincide, but lie close to one another in the speed diagram.

Figure 7B:
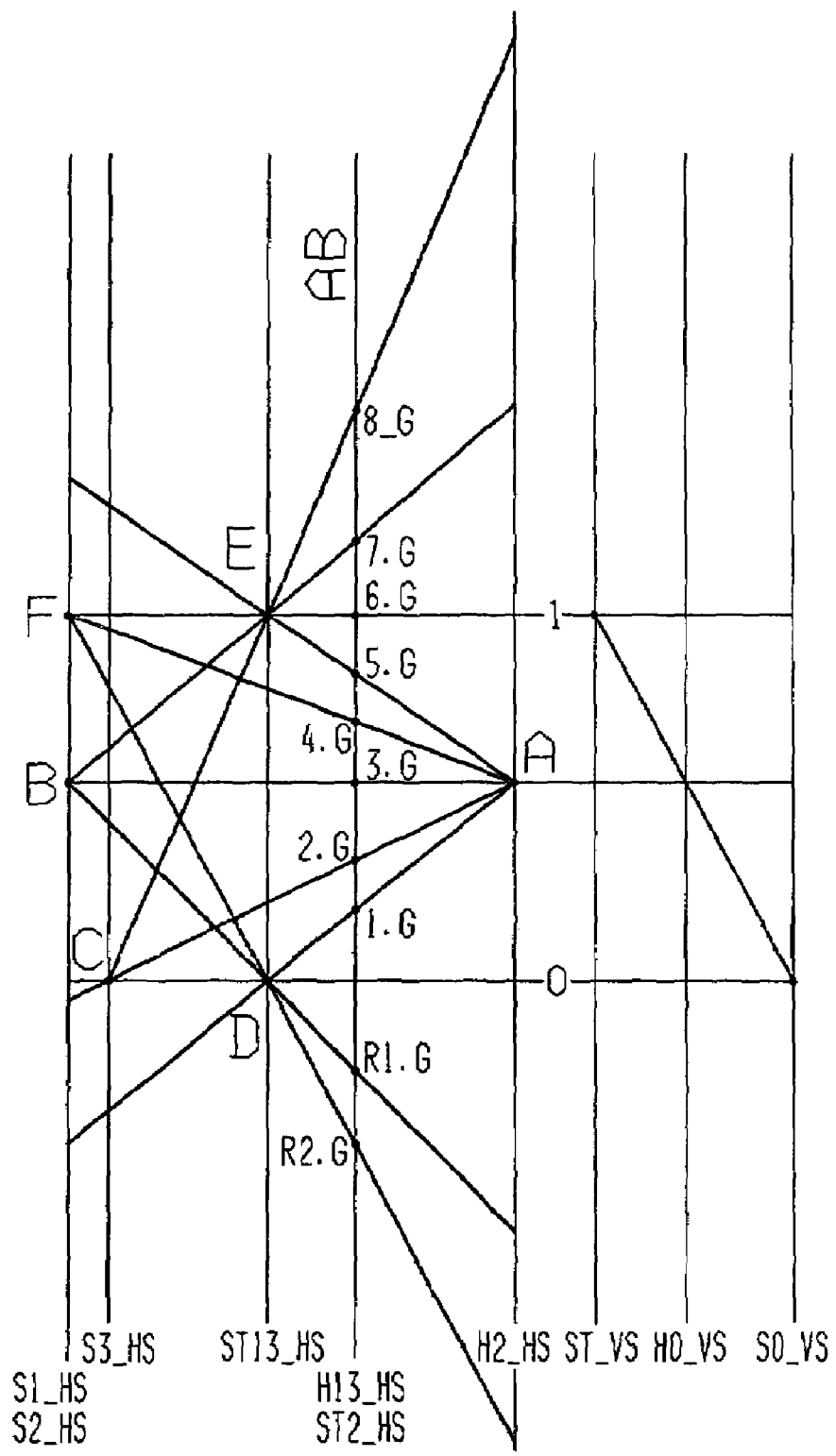
FIG. 7B is a speed diagram for the transmission according to FIG. 7A.

To clarify this situation, FIG. 7B shows a speed diagram for the automatic transmission shown in FIG. 7A. For example, if the fixed transmission ratio of the first of the three coupled planetary gearsets of the main gearset HS, defined by the ratio between the number of teeth of the ring gear H13_HS and the sun gear S1_HS, is larger than the fixed transmission ratio of the third of the three coupled planetary gearsets of the main gearset HS, defined by the ratio between the numbers of teeth on the ring gear H13_HS and the sun gear S3_HS and by the ratio between the numbers of teeth on the two stages of the stepped planetary gears P13_HS, then the line of the fourth input element S3_HS of the main gearset HS in the speed diagram will be close to the line of the first input element S1_HS or S2_HS of the main gearset HS to the right thereof, i.e., closer to the line of the drive output element H13_HS or ST2_HS of the main gearset HS than the line of the first input element S1_HS or S2_HS of the main gearset HS. Thus, in the speed diagram the three shift elements B, C and F also no longer have a common line, and only the two clutches B and F still lie on a common line. Accordingly, the main gearset shown in FIG. 6 can also be interpreted as a special case of the main gearset shown in FIG. 7A, in which—in contrast to FIG. 7A and FIG. 7B—the lines of the first and fourth input elements S1_HS or S2_HS, S3_HS of the main gearset HS coincide.

To a person with knowledge of the field, from this it is clear that it is also possible without problem to divide all the central gears (sun gears, ring gears) of the multi-component main gearset HS, like the components shown in the examples illustrated in FIGS. 6 and 7A, into two or more components while maintaining the number of main gearset carriers at two, so that these divided central gears are then each kinematically in active connection with one another, via the planetary gears associated with them. Of course, the planetary gears corresponding to this divided central gear can be made as unstepped or stepped planetary gears. An example of such a further division of central gears of the main gearset is illustrated in another speed diagram shown in FIG. 7C, in which—starting from the automatic transmission according to FIG. 7A—in the main gearset the original third sun gear is again divided into sun gears S3_HS and S4_HS, i.e., now providing a total of four sun gears S1_HS, S2_HS, S3_HS, and S4_HS, a coupled ring gear H134_HS, a simple ring gear H2_HS, a coupled carrier ST134_HS and a simple carrier ST2_HS. In principle, this main gearset is thus a four-carrier, five-shaft planetary transmission reduced to a two-carrier unit with five input elements not connected to one another and one output element. The planetary gears of the simple carrier ST2_HS again mesh with the simple ring gear H2_HS and the second sun gear S2_HS, but the planetary gears of the "new" coupled carrier ST134_HS are now made as stepped planetaries and mesh with the coupled ring gear H134_HS and the other three sun gears S1_HS, S3_HS, S4_HS of the main gearset, these two "new" sun gears S3_HS, S4_HS having different numbers of teeth. The two sun gears S1_HS, S2_HS coupled with one another form the first input element of the main gearset and are connected with the output element of clutch B. The ring gear H2_HS forms the second input element of the main gearset and is connected with the output element of clutch A. The carrier ST134_HS forms the third input element of the main gearset and is connected with the output elements of shift elements E and D. The "new" third sun gear S3_HS forms the fourth input element of the main gearset, which is now exclusively connected with the output element of brake C. The "new" fourth sun gear S4_HS forms the fifth input element of the main gearset, which is exclusively connected to the output element of clutch F. Finally, the ring gear H134_HS and the carrier ST2_HS are coupled with one another and form the output element of the main gearset connected to the drive output shaft AB.

Figure 7C:
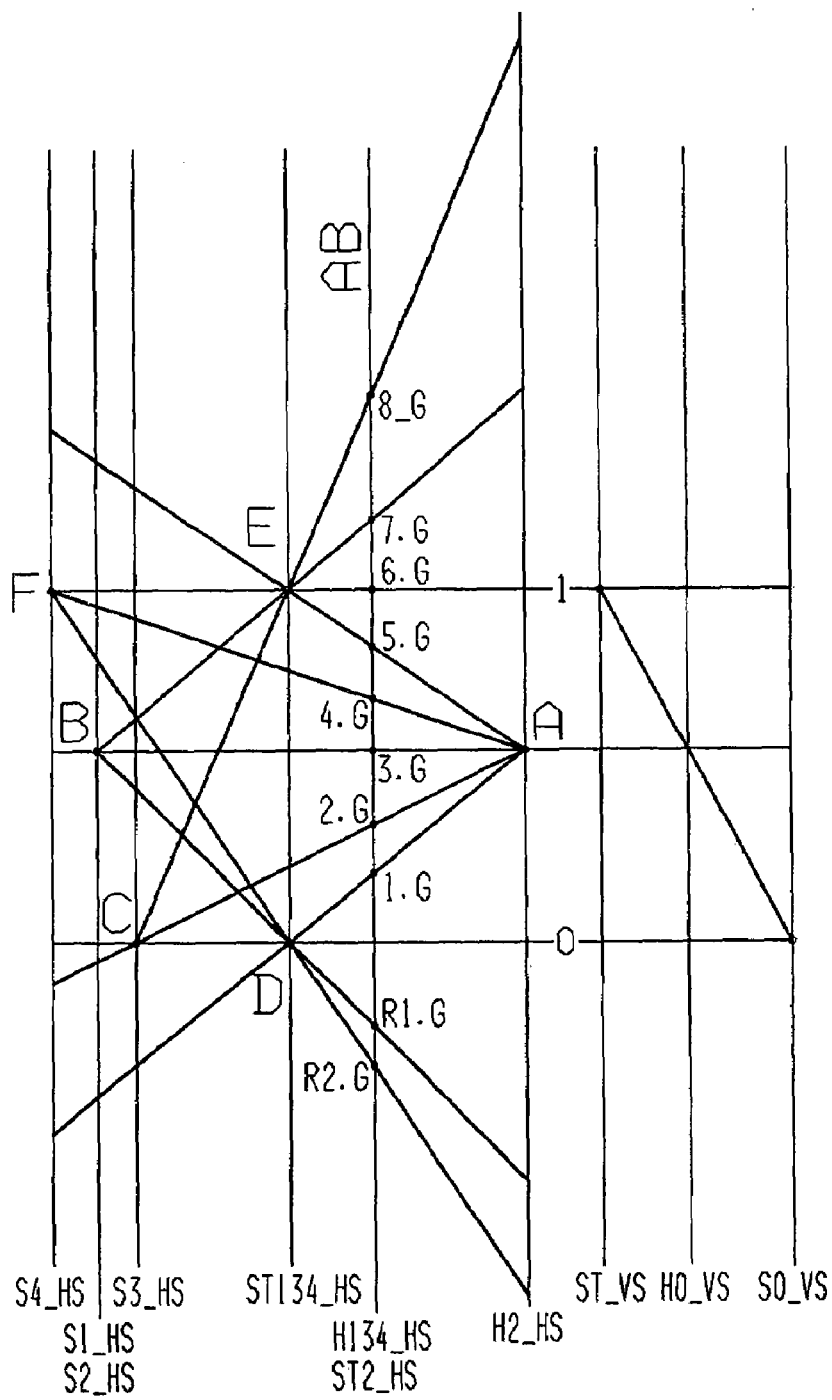
FIG. 7C is a speed diagram for a transmission with a main gearset modified relative to that of FIG. 7A.

In the example shown in FIG. 7C, the fixed transmission ratio of the first of the four coupled planetary gearsets of the main gearset, defined by the ratio between the number of teeth on the ring gear H134_HS and the sun gear S1_HS, is larger than the fixed transmission ratio of the third of the four coupled planetary gearsets of the main gearset, defined by the ratio between the number of teeth on the ring gear H134_HS and the sun gear S3_HS and by the ratio between the number of teeth on the steps of the stepped planetary gears of the main gearset, and is smaller than the fixed transmission ratio of the fourth of the four coupled planetary gearsets of the main gearset, defined by the ratio between the numbers of teeth on the ring gear H134_HS and the sun gear S4_HS and by the ratio between the number of teeth on the steps of the stepped planetary gears of the main gearset. Herefrom it follows on one hand, that the line of the fourth input element S3_HS of the main gearset in the speed diagram is close to the line of the first input element S1_HS or S2_HS of the main gearset to the right thereof i.e., closer to the line of the drive output element H13_HS or ST2_HS of the main gearset than the line of the first input element S1_HS or S2_HS of the main gearset. On the other hand it is also apparent that the line of the fifth input element S4_HS of the main gearset in the speed diagram is positioned close to the line of the first input element S1_HS or S2_HS of the main gearset to the left thereof, i.e., further away from the line of the drive output element H13_HS or ST2_HS of the main gearset than the line of the first input element S1_HS or S2_HS of the main gearset. In relation to the input elements of the main gearset, therefore, all three of the shift elements B, C and F are on different lines in the speed diagram.

Figure 8:
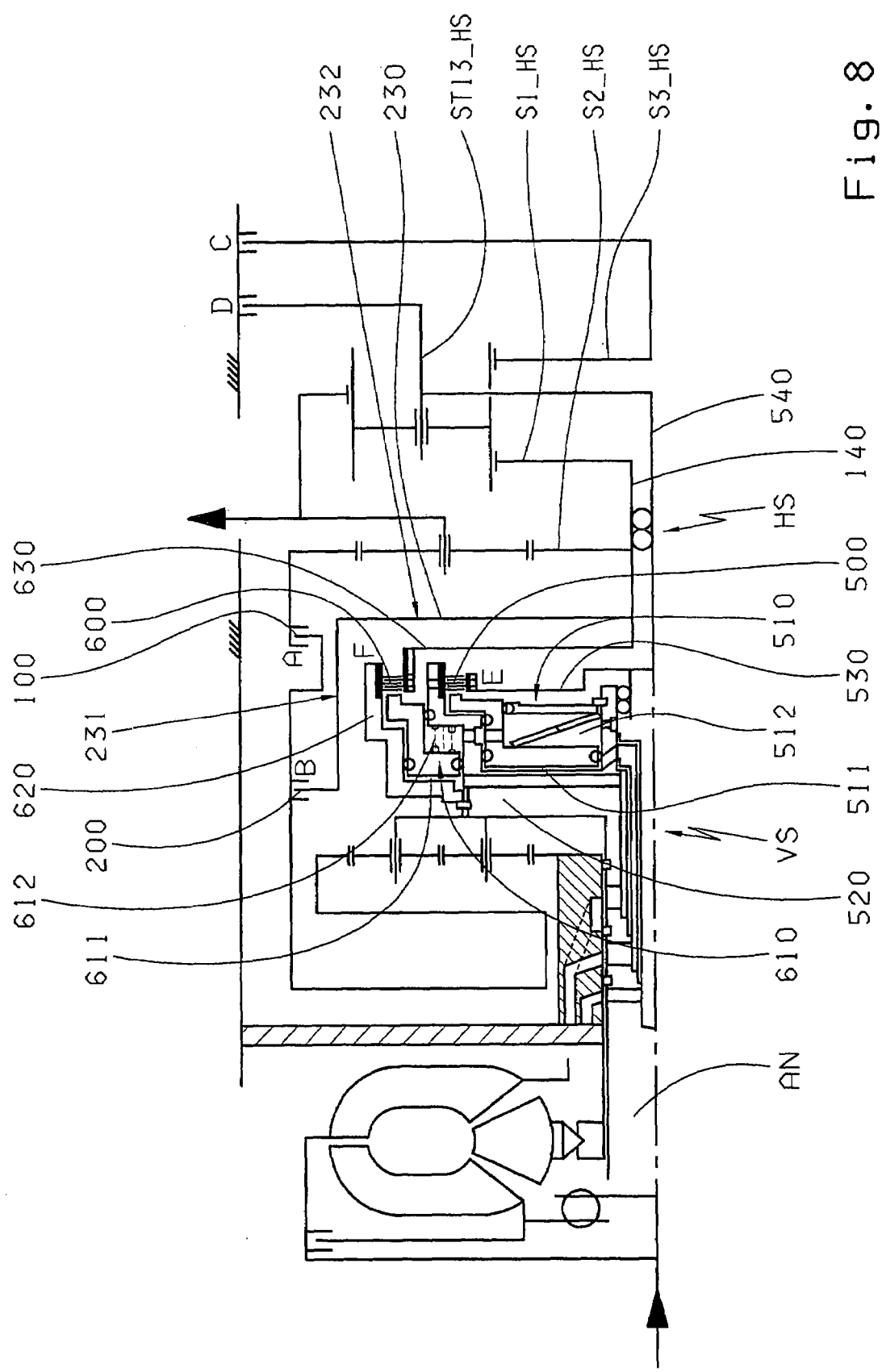
FIG. 8 is a seventh example embodiment of a transmission design according to the invention, based on the transmission shown in FIG. 6, but with an alternative shift element arrangement.

Referring to FIG. 8, a seventh example embodiment of a transmission design according to the present invention will now be explained, which is again based on the transmission design described earlier with reference to FIG. 6, but with another alternative arrangement of the fifth shift element E, again suitable for a transmission with a non-co-axial arrangement of the drive input and drive output shafts AN, AB. In contrast to FIG. 6, the clutch E is now, like the clutch F, arranged in an area axially between the transfer gearset VS and the main gearset HS, axially directly adjacent the transfer gearset VS. The clutches E and F form a structural group, simple to preassemble from the production technology standpoint, which comprises the two input elements 520, 620 of clutches E and F, here for example, made as outer disk carriers, the servomechanisms 510, 610 of the two clutches E and F, and the disk sets 500, 600 of the two clutches E and F.

In this case the clutch F is spatially arranged radially over the clutch E, in particular with the disk set 600 of clutch F spatially arranged radially over the disk set 500 of clutch E. The input element or outer disk carrier 520 of clutch E is made geometrically in the form of a pot, open in the direction of the main gearset HS, whose hub is connected, in a rotationally fixed manner, to the drive input shaft AN, and in the example shown, even forms a common component with the drive input shaft AN. The servomechanism 510 of clutch E is arranged completely inside a cylindrical space formed by the outer disk carrier 520 of clutch E, and is mounted to move axially on this outer disk carrier 520. Correspondingly, the servomechanism 510 always rotates at the speed of the drive input shaft AN. To offset the rotational pressure of the rotating pressure chamber 511 of the servomechanism 510, dynamic pressure compensation is provided by a pressure equalization chamber 512, and the pressure chamber 511 is arranged closer to the transfer gearset VS than the pressure equalization chamber 512.

The input element or outer disk carrier 620 of the clutch F is also made geometrically in the form of a pot, open toward the main gearset HS, whose hub is connected, in a rotationally fixed manner, with the input element or outer disk carrier 520 of clutch E at its outer diameter. The input element 620 of clutch F is thus connected, via the input element 520 of clutch E, to the drive input shaft AN. The servomechanism 610 of clutch F is arranged completely inside a cylindrical space formed by the outer disk carrier 620 of clutch F, and is mounted to move axially on this outer disk carrier 620. Correspondingly, the servomechanism 610 always rotates at the speed of the drive input shaft AN. To offset the rotational pressure of the rotating pressure chamber 611 of the servomechanism 610, dynamic pressure compensation is provided by a pressure equalization chamber 612, and the pressure chamber 611 is arranged closer to the transfer gearset VS than the pressure equalization chamber 612.

The servomechanism 610 of the (radially outer) clutch F is spatially arranged in an area radially over the servomechanism 510 of the (radially inner) clutch E. Correspondingly, the pressure chamber 611 of the (radially outer) servomechanism 610 of clutch F is arranged approximately radially over the pressure chamber 511 of the (radially inner) servomechanism 510 of clutch E, and the pressure equalization chamber 612 of the (radially outer) servomechanism 610 of clutch F is arranged at least approximately radially over the pressure equalization chamber 512 of the (radially inner) servomechanism 510 of clutch E. A pressure medium supply to the pressure chamber 511 and a lubricant supply to the pressure equalization chamber 512 of the servomechanism 510 of clutch E, which can be filled with unpressurized lubricant, pass partly within the hub of the input element (outer disk carrier) 520 of clutch E and partly within the drive input shaft AN. A pressure medium supply to the pressure chamber 611 of the servomechanism 610 of the (radially outer) clutch F also passes partly within the outer disk carrier 520 of the (radially inner) clutch E and partly within the drive input shaft AN. In this case, the pressure equalization chamber 612 of the servomechanism 610 of clutch F is filled with unpressurized lubricant directly, via the pressure equalization chamber 512 of the servomechanism 510 of clutch E. To engage the clutch E, the pressure chamber 511 of the servomechanism 510 is filled with pressure medium to actuate the disk set 500 of clutch E associated with it, axially in the direction of the main gearset HS. To engage the clutch F, the pressure chamber 611 of the servomechanism 610 is filled with pressure medium to actuate the disk set 600 of clutch F associated with it, axially in the direction of the main gearset HS.

The output elements 530, 630 of the two clutches E, F are both made as inner disk carriers in the example embodiment shown. The inner disk carrier 530 of clutch E extends, starting from the disk set 500 of clutch E axially adjacent the servomechanism 510 of clutch E, radially inward, and is centrally connected, in a rotationally fixed manner, to the carrier shaft 540. This carrier shaft 540 extends axially toward the main gearset HS as far as the carrier plate of the (coupled) first carrier ST13_HS of the main gearset HS remote from the transfer gearset, thereby passing centrally through the second and first sun gears S2_HS, S1_HS of the main gearset HS in the axial direction, and being connected, in a rotationally fixed manner, in an area axially between the third and first sun gears S3_HS, S1_HS of the main gearset HS, to the carrier plate of the carrier ST13_HS. Of course, the carrier plate of the carrier ST13_HS and the carrier shaft 540 can also be made as one piece. The inner disk carrier 630 of the clutch F extends, starting from the disk set 600 of clutch F, partly axially adjacent the inner disk carrier 530 of clutch E, radially inward as far as a diameter just above the carrier shaft 540, and is connected, in a rotationally fixed manner, in this hub area with a hub of the output element 230 of clutch B and, via the sun shaft 140, with the two sun gears S2_HS and S1_HS of the main gearset HS. Thus, the carrier shaft 540 extends centrally within this hub of the output element 630 of clutch F and the hub of the output element 230 of the clutch B, and centrally within the sun shaft 140. If necessary, those with knowledge of the subject could also form the connection between the hubs of the two output elements 230, 630, via the sun shaft 140, or even make the two sun gears S2_HS, S1_HS as one piece.

In the example embodiment shown, the disk sets 200 and 100 of the two clutches B and A are spatially arranged axially next to one another on at least similar diameters in an area at least partly radially over the structural group formed of the two clutches E and F. The output element 230 of clutch B then radially overlaps the structural group formed of the two clutches E, F in the axial direction, such that the cylindrical section 231 of this output element 230 extends at least largely radially above the outer diameter of the input element (outer disk carrier) 620 of clutch F and therefore completely overlaps the clutch F, and such that the disk-shaped section 232 of this output element 230 extends at least largely parallel to the output element (inner disk carrier) 630 of clutch F.

In other respects, the component arrangement shown in FIG. 8 corresponds essentially to the arrangement already shown in FIG. 6.

Figure 9:
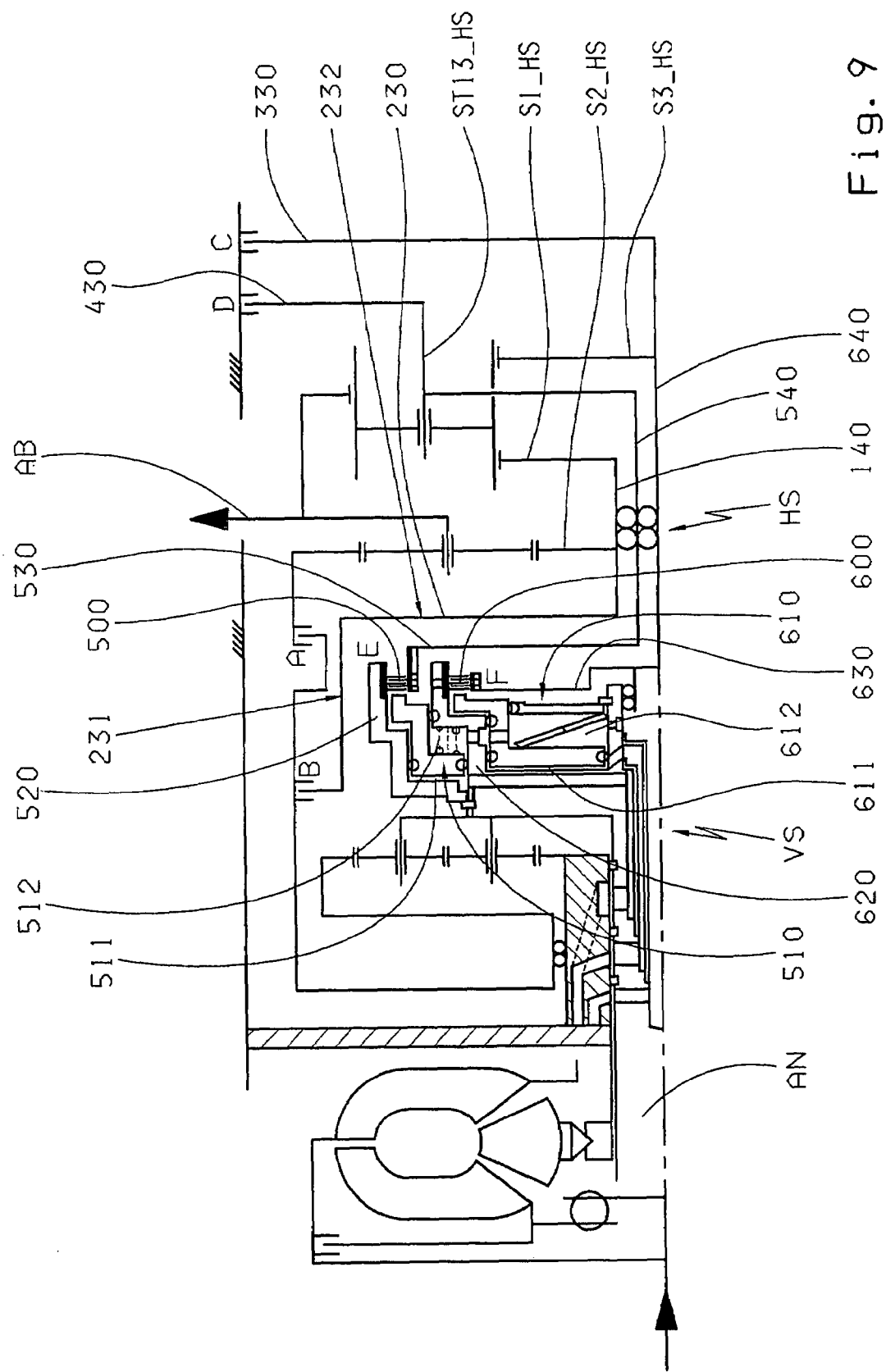
FIG. 9 is an eighth example embodiment of a transmission design according to the invention, based on the transmission shown in FIG. 8 but with an alternative shift element arrangement.

Referring to FIG. 9, an eighth example embodiment of a transmission design according to the present invention will now be explained, which is again based on the transmission design described previously with reference to FIG. 8, but with a further alternative arrangement of the fifth shift element E, again suitable for a transmission with non-co-axial arrangement of the drive input and drive output shafts AN, AB. As in FIG. 8, the clutches E and F form a structural group, which is easy to preassemble from the standpoint of production technology, which comprises the input elements 520, 620 of the clutches E and F, here for example both made as outer disk carriers, the servomechanisms 510, 610 of the two clutches E and F, and the disk sets 500, 600 of the clutches E and F. In contrast to FIG. 8, however, the clutch E is now spatially arranged over the clutch F, in particular with the disk set 500 of clutch E spatially arranged radially over the disk set 600 of clutch F.

The input element or outer disk carrier 620 of clutch F is made geometrically in the form of a pot, open in the direction of the main gearset HS, whose hub is connected, in a rotationally fixed manner, to the drive input shaft AN, and in the example shown even forms a common component with the drive input shaft AN. The servomechanism 610 of clutch F is arranged completely inside a cylindrical space formed by the outer disk carrier 620 of clutch F, and is mounted to move axially on this outer disk carrier 620. Correspondingly, the servomechanism 610 always rotates at the speed of the drive input shaft AN. To offset the rotational pressure of the rotating pressure chamber 611 of the servomechanism 610, dynamic pressure compensation is provided by a pressure equalization chamber 612, and the pressure chamber 611 is arranged closer to the transfer gearset VS than the pressure equalization chamber 612.

The input element or outer disk carrier 520 of the clutch E is also made geometrically in the form of a pot, open in the direction of the main gearset HS, whose hub is connected, in a rotationally fixed manner, to the input element or outer disk carrier 620 of clutch F at the outer diameter thereof. The input element 520 of clutch E is thus connected, via the input element 620 of clutch F, to the drive input shaft AN. The servomechanism 510 of clutch E is arranged completely inside a cylindrical space formed by the outer disk carrier 520 of clutch E, and is mounted to move axially on this outer disk carrier 520. Correspondingly, the servomechanism 510 always rotates at the speed of the drive input shaft AN. To offset the rotational pressure of the rotating pressure chamber 511 of the servomechanism 510, dynamic pressure compensation is provided by a pressure equalization chamber 512, and the pressure chamber 511 is arranged closer to the transfer gearset VS than the pressure equalization chamber 512.

The servomechanism 510 of the (radially outer) clutch E is arranged spatially in an area radially over the servomechanism 610 of the (radially inner) clutch F. Correspondingly, the pressure chamber 511 of the (radially outer) servomechanism 510 of clutch E is arranged at least approximately radially over the pressure chamber 611 of the (radially inner) servomechanism 610 of clutch F, and the pressure equalization chamber 512 of the (radially outer) servomechanism 510 of the clutch E is arranged at least approximately radially over the pressure equalization chamber 612 of the (radially inner) servomechanism 610 of the clutch F. The pressure medium supply to the pressure chamber 611 and the lubricant supply to the pressure equalization chamber 612 of the servomechanism 610 of clutch F, which can be filled with unpressurized lubricant, pass partly within the hub of the input element (outer disk carrier) 620 of clutch F, and partly within the drive input shaft AN. The pressure medium supply to the pressure chamber 511 of the servomechanism 510 of the (radially outer) clutch E also passes partly within the outer disk carrier 620 of the (radially inner) clutch F and partly within the drive input shaft AN. In this case, the pressure equalization chamber 512 of the servomechanism 510 of clutch E can, for example, be filled with unpressurized lubricant directly, via the pressure equalization chamber 612 of the servomechanism 610 of clutch F. To engage clutch E, the pressure chamber 511 of the servomechanism 510 is filled with pressure medium to actuate the disk set 500 of clutch E associated with it, axially in the direction of the main gearset HS. To engage clutch F, the pressure chamber 611 of the servomechanism 610 is filled with pressure medium to actuate the disk set 600 of clutch F associated with it, axially also toward the main gearset HS.

In accordance with the kinematic coupling between the output elements 230, 530, 630 of the clutches B, E, F and the three sun gears S1_HS, S2_HS, S3_HS of the main gearset HS, the second sun gear S2_HS, as in FIG. 8, is arranged close to the transfer gearset and the first sun gear S1_HS is arranged axially between the second and third sun gears S1_HS, S3_HS. In contrast to FIG. 8, the first input element of the main gearset HS, formed by the sun gears S1_HS and S2_HS permanently connected with one another, is now connected only to the output element 230 of clutch B, while in contrast, the fourth input element of the main gearset HS, formed by the third sun gear S3_HS, is now connected both to the output element 330 of brake C and to the output element 630 of clutch F. Naturally, the sun gears S2_HS and S3_HS connected with one another by the short sun shaft 140 can, if necessary, also be made as one piece.

The output elements 530, 630 of the two clutches E, F are both made as inner disk carriers in the example embodiment shown. The inner disk carrier 630 of clutch F extends, starting from the disk set 600 of clutch F, radially inward and axially adjacent the servomechanism 610 of clutch F, and is centrally connected, in a rotationally fixed manner, to a third sun shaft 640. This third sun shaft 640 extends axially in the direction of the main gearset HS at least as far as its third sun gear S3_HS remote from the transfer gearset, thereby passing centrally in the axial direction at least through the second sun gear S2_HS (near the transfer gearset) and the (spatially central) first sun gear S1_HS of the main gearset HS, and being connected, in a rotationally fixed manner, to the third sun gear S3_HS. In principle, the third sun shaft 640 also passes centrally through this third sun gear S3_HS, since the output element 330 of brake C is connected, in a rotationally fixed manner, on the side of the main gearset HS remote from the transfer gearset to this third sun gear S3_HS or to the third sun shaft 640. The inner disk carrier 530 of clutch E extends, starting from the disk set 500 of clutch E, radially inward and partly axially adjacent the inner disk carrier 630 of clutch F, as far as a diameter just above the third sun shaft 640, and is connected, in a rotationally fixed manner, to the carrier shaft 540 in this hub area. In turn, this carrier shaft 540 encloses the third sun shaft 640 radially, thereby extending axially toward the main gearset HS as far as the carrier plate of the coupled carrier ST13_HS of the main gearset HS remote from the transfer gearset, also passing through the second and first sun gears S2_HS, S1_HS of the main gearset HS in the axial direction, and being connected, in a rotationally fixed manner, in an area axially between the first and third sun gears S1_HS, S3_HS, of the main gearset HS to the carrier plate of the coupled carrier ST13_HS. Of course, the carrier plate of the carrier ST13_HS and the carrier shaft 540 can also be made as one piece.

In the example embodiment shown, the disk sets 200 and 100, of the two clutches B and A are spatially arranged axially next to one another on an at least similar diameter in an area at least partly radially over the structural group formed of the two clutches E, F. The output element 230 of clutch B radially overlaps the structural group formed of the two clutches E and F in the axial direction, such that the cylindrical section 231 of this output element 230 extends at least largely radially above the outer diameter of the input element (outer disk carrier) 520 of clutch E, thereby completely overlapping the clutch E, and such that the disk-shaped section 232 of this output element 230 extends radially inward at least largely parallel to the output element (inner disk carrier) 530 of clutch E, as far as a diameter just above the carrier shaft 540. In its hub area the output element 230 of clutch B is connected, in a rotationally fixed manner, to the second sun gear S2_HS of the main gearset HS close to the transfer gearset, and via the sun shaft 140, also to the (spatially central) first sun gear S1_HS of the main gearset HS. Thus, the carrier shaft 540 passes centrally within this hub of the output element 230 of clutch E and centrally within the sun shaft 140.

In other respects, the component arrangement shown in FIG. 9 corresponds essentially to the arrangement already shown in FIG. 8.

REFERENCE NUMERALS

A first shift element, clutch
B second shift element, clutch
C third shift element, brake D fourth shift element, brake
E fifth shift element, clutch
F sixth shift element, clutch
AN drive input shaft
AB drive output shaft
GG transmission housing
GN hub on the housing wall
GW housing wall
GZ intermediate housing wall
ZYLAB disk carrier common to the first and second shift elements
VS transfer gearset
HO_VS ring gear of the transfer gearset
SO_VS sun gear of the transfer gearset
ST_VS (coupled) carrier of the transfer gearset
P1_VS inner planetary gear of the transfer gearset
P2_VS outer planetary gear of the transfer gearset
HS main gearset
HO_HS (single) ring gear of the main gearset
H1_HS first ring gear of the main gearset
H13_HS coupled (first) ring gear of the main gearset
H134_HS coupled (first) ring gear of the main gearset
H2_HS second ring gear of the main gearset
S1_HS first sun gear of the main gearset
S2_HS second sun gear of the main gearset
S3_HS third sun gear of the main gearset
S4_HS fourth sun gear of the main gearset
ST_HS coupled (single) carrier of the main gearset
ST1_HS first carrier of the main gearset
ST13_HS coupled (first) carrier of the main gearset
ST134_HS coupled (first) carrier of the main gearset
ST2_HS second carrier of the main gearset
P1_HS long planetary gear of the main gearset
P13_HS coupled long planetary gear of the main gearset
P2_HS short planetary gear of the main gearset
PL_HS first planetary gear of the main gearset
PLa_HS outer planetary gear of the main gearset
PLi_HS inner planetary gear of the main gearset
100 disks of the first shift element
110 servomechanism of the first shift element
111 pressure chamber of the first shift element
112 pressure equalization chamber of the first shift element
113 restoring element of the servomechanism of the first shift element
114 piston of the servomechanism of the first shift element
115 diaphragm plate of the servomechanism of the first shift element
120 input element of the first shift element, outer disk carrier
121 cylindrical section of the input element of the first shift element
123 hub of the input element of the first shift element
130 output element of the first shift element
131 cylindrical section of the output element of the first shift element
132 disk-shaped section of the output element of the first shift element
140 second sun shaft
200 disks of the second shift element
210 servomechanism of the second shift element
211 pressure chamber of the second shift element
212 pressure equalization chamber of the second shift element
213 restoring element of the servomechanism of the second shift element
214 piston of the servomechanism of the second shift element
215 diaphragm plate of the servomechanism of the second shift element
220 input element of the second shift element
221 cylindrical section of the input element of the second shift element
222 disk-shaped section of the input element of the second shift element
223 hub of the input element of the second shift element
230 output element of the second shift element
231 first cylindrical section of the output element of the second shift element
232 disk-shaped section of the output element of the second shift element
234 second cylindrical section of the output element of the second shift element
240 first sun shaft
300 disks of the third shift element
310 servomechanism of the third shift element
330 output element of the third shift element
400 disks of the fourth shift element
410 servomechanism of the fourth shift element
411 pressure chambers of the fourth shift element
430 output element of the fourth shift element
500 disks of the fifth shift element
510 servomechanism of the fifth shift element
520 input element of the fifth shift element
521 cylindrical section of the input element of the fifth shift element
522 disk-shaped section of the input element of the fifth shift element
523 hub of the input element of the fifth shift element
530 output element of the fifth shift element
540 carrier shaft
600 disks of the sixth shift element
610 servomechanism of the sixth shift element
611 pressure chamber of the sixth shift element
612 pressure equalization chamber of the sixth shift element
613 restoring element of the servomechanism of the sixth shift element
614 piston of the servomechanism of the sixth shift element
615 diaphragm plate of the servomechanism of the sixth shift element
620 input element of the sixth shift element, outer disk carrier
621 cylindrical section of the input element of the sixth shift element
622 disk-shaped section of the input element of the sixth shift element
623 hub of the input element of the sixth shift element
630 output element of the sixth shift element
631 cylindrical section of the output element of the sixth shift element
632 disk-shaped section of the output element of the sixth shift element
633 hub of the output element of the sixth shift element
640 third sun shaft

The invention claimed is:

1. A multi-stage automatic transmission having a drive input shaft (AN), a drive output shaft (AB), a transfer gearset ((VS), a main gearset (HS) and at least first, second, third, fourth, fifth and sixth shift elements (A to F), and the transmission comprising:
the transfer gearset (VS) being a double planetary gearset,
an output element of the transfer gearset (VS) rotating, during operation, at a speed lower than the input speed of the drive input shaft (AN),
an input element of the transfer gearset (VS) being permanently connected with the drive input shaft (AN), an element of the transfer gearset (VS) being connected with a transmission housing (GG) of the multi-stage automatic transmission, the main gearset (HS) being a coupled planetary gearset having at least a first input element, a second input element and a third input element and one output element, the output element of the main gearset (HS) being permanently connected with the drive output shaft (AB), an input element (120) of the first shift element (A) being connected with the output element of the transfer gearset (VS), an output element (130) of the first shift element (A) being connected with the second input element of the main gearset (HS), an input element (220) of the second shift element (B) being connected with the output element of the transfer gearset (VS), an output element (230) of the second shift element (B) being connected with the first input element of the main gearset (HS), an input element of the third shift element (C) being connected with the transmission housing (GG), one of:

an output element (330) of the third shift element (C) being connected with the first input element of the main gearset (HS), and an output element (630) of the sixth shift element (F) being connected with the first input element of the main gearset (HS), the output element (330) of the third shift element (C) being connected with a fourth input element of the main gearset (HS), and the output element (630) of the sixth shift element (F) being connected with the first input element of the main gearset (HS), the output element (330) of the third shift element (C) being connected with the fourth input element of the main gearset (HS) and the output element (630) of the sixth shift element (F) being connected with the fourth input element of the main gearset (HS), and the output element (330) of the third shift element (C) being connected with the fourth input element of the main gearset (HS) and the output element (630) of the sixth shift element (F) being connected with a fifth input element of the main gearset (HS), an input element of the fourth shift element (D) being connected with the transmission housing (GG), an output element (430) of the fourth shift element (D) being connected with the third input element of the main gearset (HS), an input element (520) of the fifth shift element (E) being connected with the drive input shaft (AN), an output element (530) of the fifth shift element (E) being connected with the third input element of the main gearset (HS), an input element (620) of the sixth shift element (F) being connected with the drive input shaft (AN), wherein a disk packet (600) of this sixth shift element (F) and a servomechanism (610), for actuating this disk packet (600) of the sixth shift element (F), are spatially arranged in an area axially between the transfer gearset (VS) and the main gearset (HS), a pressure chamber (211) of a servomechanism (210), for actuating a disk packet (200) of the second shift element (B), is spatially arranged on the side of the transfer gearset (VS) facing away from the main gearset (HS), the transfer gearset (VS) comprises a sun gear (SO_VS), a ring gear (HO_VS) and a coupled carrier (ST_VS), on which inner and outer planetary gears (P1_VS, P2_VS) are mounted to rotate such that:

the inner planetary gears (P1_VS) of the transfer gearset (VS) mesh with the sun gear (SO_VS) and the outer planetary gears (P2_VS) of the transfer gearset (VS), the outer planetary gears (P2_VS) of the transfer gearset (VS) mesh with the inner planetary gears (P1_VS) and the ring gear (HO_VS) of the transfer gearset (VS), the carrier (ST_VS) of the transfer gearset (VS) forms the input element of the transfer gearset (VS) permanently connected with the drive input shaft (AN), the ring gear (HO_VS) of the transfer gearset (VS) forms the output element of the transfer gearset (VS) that can be connected with input elements of the main gearset (HS), and the sun gear (SO_VS) of the transfer gearset (VS) is fixed to the transmission housing (GG).

2. The multi-stage automatic transmission according to claim 1, wherein the main gearset (HS) is a reduced three-carrier, five-shaft transmission with three sun gears (S1_HS, S2_HS, S3_HS), a coupled ring gear (H13_HS), a second ring gear (H2_HS), a coupled carrier (ST13_HS) with long planetary gears (P13_HS) mounted to rotate on it, and a second carrier (ST2_HS) with short planetary gears (P2_HS) mounted to rotate on it, such that:

the first sun gear (S1_HS) of the main gearset (HS) is arranged axially between the second and the third sun gears (S2_HS, S3_HS) of the main gearset (HS), the long planetary gears (P13_HS) of the main gearset (HS) mesh with the coupled ring gear (H13_HS) and the first and the third sun gears (S1_HS, S3_HS) of the main gearset (HS), the short planetary gears (P2_HS) of the main gearset (HS) mesh with the second ring gear (H2_HS) and the second sun gear (S2_HS) of the main gearset (HS), the first and the second sun gears (S1_HS, S2_HS) of the main gearset (HS) are permanently connected with one another to form the first input element of the main gearset (HS) and are connected with the output elements (230, 630) of the second and sixth shift elements (B, F), the second ring gear (H2_HS) of the main gearset (HS) forms the second input element of the main gearset (HS) and is connected with the output element of the first shift element (A), the coupled carrier (ST13_HS) of the main gearset (HS) forms the third input element of the main gearset (HS) and is connected with the output elements (430, 530) of the fourth and the fifth shift elements (D, E), the third sun gear (S3_HS) of the main gearset (HS) forms the fourth input element of the main gearset (HS) and is connected with the output element (330) of the third shift element (C), and the coupled ring gear (H13_HS) and the second carrier (ST2_HS) of the main gearset (HS) are permanently connected with one another to form the output element of the main gearset (HS), which is connected to the drive output shaft (AB).

3. The multi-stage automatic transmission according to claim 1, wherein the main gearset (HS) is a reduced three-carrier, five-shaft transmission with three sun gears (S1_HS, S2_HS, S3_HS), a coupled ring gear (H13_HS), a second ring gear (H2_HS), a coupled carrier (ST13_HS) with long planetary gears (P13_HS) mounted to rotate on it, and a second carrier (ST2_HS) with short planetary gears (P2_HS) mounted to rotate on it, such that:

the first sun gear (S1_HS) of the main gearset (HS) is arranged axially between the second and the third sun gears (S2_HS, S3_HS) of the main gearset (HS), the long planetary gears (P13_HS) of the main gearset (HS) mesh with the coupled ring gear (H13_HS) and the first and the third sun gears (S1_HS, S3_HS) of the main gearset (HS), the short planetary gears (P2_HS) of the main gearset (HS) mesh with the second ring gear (H2_HS) and the second sun gear (S2_HS) of the main gearset (HS), the first and the second sun gears (S1_HS, S2_HS) of the main gearset are permanently connected with one another to form the first input element of the main gearset (HS), connected to the output element (230) of the second shift element (B), the second ring gear (H2_HS) of the main gearset (HS) forms the second input element of the main gearset (HS) and is connected with the output element (130) of the first shift element (A), the coupled carrier (ST13_HS) of the main gearset (HS) forms the third input element of the main gearset (HS) and is connected with the output elements (430, 530) of the fourth and fifth shift elements (D, E), the third sun gear (S3_HS) of the main gearset (HS) forms the fourth input element of the main gearset (HS) and is connected with the output elements (330, 630) of the third and the sixth shift elements (C, F), and the coupled ring gear (H13_HS) and the second carrier (ST2_HS) of the main gearset (HS) are permanently connected with one another to form the output element of the main gearset (HS), which is connected to the drive output shaft (AB).

4. The multi-stage automatic transmission according to claims 2, wherein the coupled carrier (ST13_HS) of the main gearset (HS) comprises a carrier plate which extends inward, in a radial direction, axially between the first and the third sun gears (S1_HS, S3_HS) of the main gearset (HS), such that a hub of this carrier plate connected rotationally fixed to the output element (530) of the fifth shift element (E), or a carrier shaft (540) connected rotationally fixed with this carrier plate and the output element (530) of the fifth shift element (E), passes centrally, in an axial direction, one of through the first and the second sun gears (S1_HS, S2_HS) of the main gearset and through the third sun gear (S3_HS) of the main gearset (HS).

5. The multi-stage automatic transmission according to claim 1, wherein the main gearset (HS) is a reduced three-carrier, five-shaft transmission with three sun gears (S1_HS, S2_HS, S3_HS), a coupled ring gear (H13_HS), a second ring gear (H2_HS), a coupled carrier (ST13_HS) with long planetary gears (P13_HS) mounted to rotate on it, and a second carrier (ST2_HS) with short planetary gears (P2_HS) mounted to rotate on it, such that:

the sun gear (S3_HS) of the main gearset (HS) is arranged axially between the first and the second sun gears (S1_HS, S2_HS) of the main gearset (HS), the long planetary gears (P13_HS) of the main gearset (HS) mesh with the coupled ring gear (H13_HS) and the first and the third sun gears (S1_HS, S3_HS) of the main gearset (HS), the short planetary gears (P2_HS) of the main gearset (HS) mesh with the second ring gear (H2_HS) and the second sun gear (S2_HS) of the main gearset, the first sun gear (S1_HS) of the main gearset (HS) forms the first input element of the main gearset (HS) and is connected to the output elements (230, 630) of the second and sixth shift elements (B, F), the coupled ring gear (H13_HS) of the main gearset (HS) forms the second input element of the main gearset (HS) and is connected with the output element (130) of the first shift element (A), the second carrier (ST2_HS) of the main gearset (HS) forms the third input element of the main gearset (HS) and is connected with the output elements (430, 530) of the fourth and the fifth shift elements (D, E), the second and the third sun, gears (S2_HS, S3_HS) of the main gearset (HS) are permanently connected with one another to form the fourth input element of the main gearset (HS), and are connected to the output element (330) of the third shift element (C), and the coupled carrier (ST13_HS) and the second ring gear (H2_HS) of the main gearset (HS) are permanently connected with one another to form the output element of the main gearset (HS) which is connected with the drive output shaft (AB).

6. The multi-stage automatic transmission according to claim 5, wherein the coupled carrier (ST13_HS) of the main gearset (HS) comprises a carrier plate which extends inward, in the radial direction, axially between the first and the third sun gears (S1_HS, S3_HS) of the main gearset (HS), such that a hub of this carrier plate connected rotationally fixed to the drive output shaft (AB) of the automatic transmission, or the drive output shaft (AB) of the automatic transmission connected rotationally fixed to the said carrier plate, passes centrally through one of the second and the third sun gears (S2_HS, S3_HS) of the main gearset (HS) and through the first sun gear (S1_HS) of the main gearset (HS) in the axial direction.

7. The multi-stage automatic transmission according to claim 1, wherein the fifth shift element (E) is directly adjacent to the transfer gearset (VS), on the side thereof facing toward the main gearset (HS).

8. The multi-stage automatic transmission according to claim 1, wherein the sixth shift element (F), in particular the disk packet (600) and the servomechanism (610) of this sixth shift element (F), is spatially arranged in an area axially between the fifth shift element (E) and the main gearset (HS).

9. The multi-stage automatic transmission according to claim 1, wherein the servomechanism (610) of the sixth shift element (F) is arranged at least partially inside a cylindrical space formed by a disk carrier of the sixth shift element (F) connected to the first input element of the main gearset (HS), such that the servomechanism (610) of the sixth shift element (F) always rotates at a rotational speed of the first input element of the main gearset (HS).

10. The multi-stage automatic transmission according to claim 1, wherein the output element (630) of the sixth shift element (F) is mounted to rotate on the second sun shaft (140) by which an output element (130) of the first shift element (A) is connected to the second input element of the main gearset (HS), such that this second sun shaft (140) passes centrally through the output element (630) of the sixth shift element (F) in the axial direction.

11. The multi-stage automatic transmission according to claim 1, wherein an input element (620) of the sixth shift element (F), connected with the drive input shaft (AN), completely radially overlaps the transfer gearset (VS) and the second, first and the fifth shift elements (B, A, E) in the axial direction.

12. The multi-stage automatic transmission according to claims 1, wherein the third shift element (C) is arranged adjacent to the sixth shift element (F).

13. The multi-stage automatic transmission according to claim 1, wherein, when viewed axially in a direction of the main gearset (HS), the fourth shift element (D) is adjacent to the third shift element (C) such that the drive input shaft and the drive output shaft (AB) are coaxial with one another.

14. The multi-stage automatic transmission according to claims 1, wherein the fourth shift element (D) is arranged closer to the main gearset (HS) than is the third shift element (C).

15. The multi-stage automatic transmission according to claims 1, wherein the fourth shift element is arranged on a side of the main gearset (HS) facing away from the transfer gearset (VS) such that the drive input shaft (AN) and the drive output shaft (AB) are not coaxial with one another.

16. The multi-stage automatic transmission according to claim 1, wherein, on a side thereof facing toward the main gearset (HS), the sixth shift element (F) is directly adjacent to the transfer gearset (VS).

17. The multi-stage automatic transmission according to claim 1, wherein the servomechanism (610) of the sixth shift element (F) is arranged inside a coupling space formed by a disk carrier of the sixth shift element (F) connected to the drive input shaft (AN), and the servomechanism (610) of the sixth shift element always rotates at a rotational speed of the drive input shaft (AN).

18. The multi-stage automatic transmission according to claim 1, wherein first shift element (A) is spatially arranged in an area at least partly axially between the sixth shift element (F) and the main gearset (HS), in particular with a servomechanism (110) of the first shift element (A) spatially arranged in an area axially between the sixth shift element (F) and the main gearset (HS).

19. The multi-stage automatic transmission according to claim 1, wherein a disk packet (100) of the first shift element (A) is spatially arranged at least partly in an area radially about the sixth shift element (F).

20. The multi-stage automatic transmission according to claim 1, wherein the servomechanism (110) of the first shift element (A) always rotates at a rotational speed of the second input element of the main gearset.

21. The multi-stage automatic transmission according to claim 1, wherein a pressure chamber of a servomechanism (510) of the fifth shift element (E) is arranged on a side of the transfer gearset (VS) facing away from the main gearset (HS) and always rotates at a rotational speed of the drive input shaft (AN).

22. The multi-stage automatic transmission according to claim 1, wherein the fifth shift element (E) is arranged on a side of the main gearset (HS) facing away from the transfer gearset (VS), in particular adjacent to an outer end wall of the transmission housing (GG).

23. The multi-stage automatic transmission according to claim 1, wherein the fifth shift element (E) is arranged in an area axially between the transfer gearset (VS) and the main gearset (HS), in particular directly adjacent to the transfer gearset (VS).

24. The multi-stage automatic transmission according to claim 1, wherein the fifth shift element (E) is spatially arranged radially about the sixth shift element (F), in particular with the disk packet (500) of the fifth shift element (E) spatially arranged radially about the disk packet (600) of the sixth shift element (F).

25. The multi-stage automatic transmission according to claim 1, wherein the sixth shift element (F) is spatially arranged radially about the fifth shift element (E), in particular with the disk packet (600) of the sixth shift element (F) spatially arranged radially over the disk packet (500) of the fifth shift element (E).

26. The multi-stage automatic transmission according to claim 1, wherein the disk packets (100, 200) of the first and the second shift elements (A, B) are spatially arranged axially adjacent one another in an area at least partly radially about a structural group comprising the fifth and the sixth shift elements (E, F).

27. The multi-stage automatic transmission according to claim 1, wherein the second shift element (B) is arranged inside a cylindrical space formed by the input element (520) of the fifth shift element (E).

28. The multi-stage automatic transmission according to claim 1, wherein an input element (220) of the second shift element (B) connected to the output element of the transfer gearset (VS) is mounted to rotate on a hub (523) of the input element (520) of the fifth shift element (E).

29. The multi-stage automatic transmission according to claim 1, wherein a disk packet (200) of the second shift element (B) is at least one of spatially arranged in an area at least partly radially about the transfer gearset (VS) and at least partly radially about the sixth shift element (F), and an output element (230) of the second shift element (B), connected with the first input element of the main gearset (HS), radially overlaps the sixth shift element (F) in the axial direction.

30. The multi-stage automatic transmission according to claim 1, wherein, when viewed axially in a direction of the main gearset (HS), a disk packet (400) of the fourth shift element (D) is axially adjacent to the disk packet (500) of the fifth shift element (E).

31. The multi-stage automatic transmission according to claim 1, wherein the third shift element is arranged on a side of the main gearset (HS) facing away from the transfer gearset (VS), and the drive input shaft (AN) and drive output shaft (AB) are not coaxial with one another.

32. The multi-stage automatic transmission according to claim 1, wherein by selective engaging desired shift elements (A to F) at least eight forward gear ratios can be engaged so that an input speed of the drive input shaft (AN) can be transmitted to the drive output shaft (AB) in such manner that, to shift from one gear ratio to a next higher or a next lower gear ratio, of the shift elements actuated only one shift element is disengaged and a different shift element is engaged such that:
for a first forward gear ratio, the first and the fourth shift elements (A, D) are engaged,
for a second forward gear ratio, the first and the third shift elements (A, C) are engaged,
for a third forward gear ratio, the first and the second shift elements (A, B) are engaged,
for a fourth forward gear ratio, the first and the sixth shift elements (A, F) are engaged,
for a fifth forward gear ratio, the first and the fifth shift elements (A, E) are engaged,
for a sixth forward gear ratio, the fifth and the sixth shift elements (E, F) are engaged,
for a seventh forward gear ratio, the second and the fifth shift elements (B, E) are engaged,
for an eighth forward gear ratio, the third and the fifth shift elements (C, E) are engaged, and
for a reverse gear ratio, the fourth shift element (D) and either the second shift element (B) or the sixth shift element (F) are engaged.

33. A multi-stage automatic transmission having a drive input shaft (AN), a drive output shaft (AB), a transfer gearset ((VS), a main gearset (HS) and at least first, second, third, fourth, fifth and sixth shift elements (A to F), and the transmission comprising:

the transfer gearset (VS) being a double planetary gearset,
an output element of the transfer gearset (VS) rotating, during operation, at a speed lower than the input speed of the drive input shaft (AN),
an input element of the transfer gearset (VS) being permanently connected with the drive input shaft (AN),
an element of the transfer gearset (VS) being connected with a transmission housing (GG) of the multi-stage automatic transmission,
the main gearset (HS) being a coupled planetary gearset having at least a first input element, a second input element and a third input and one output element,
the output element of the main gearset (HS) being permanently connected with the drive output shaft (AB),
an input element (120) of the first shift element (A) being connected with the output element of the transfer gearset (VS),
an output element (130) of the first shift element (A) being connected with the second input element of the main gearset (HS),
an input element (220) of the second shift element (B) being connected with the output element of the transfer gearset (VS),
an output element (230) of the second shift element (B) being connected with the first input element of the main gearset (HS),
an input element of the third shift element (C) being connected with the transmission housing (GG),
one of:
  the output element (330) of the third shift element (C) being connected with a first input element of the main gearset (HS), and the output element (630) of the sixth shift element (F) being connected with the first input element of the main gearset (HS), and
  the output element (330) of the third shift element (C) being connected with the fourth input element of the main gearset (HS) and the output element (630) of the sixth shift element (F) being connected with the fourth input element of the main gearset (HS),
an input element of the fourth shift element (D) being connected with the transmission housing (GG),
an output element (430) of the fourth shift element (D) being connected with the third input element of the main gearset (HS),
an input element (520) of the fifth shift element (E) being connected with the drive input shaft (AN),
an output element (530) of the fifth shift element (E) being connected with the third input element of the main gearset (HS),
an input element (620) of the sixth shift element (F) being connected with the drive input shaft (AN),
wherein a disk packet (600) of this sixth shift element (F) and a servomechanism (610), for actuating this disk packet (600) of the sixth shift element (F), are spatially arranged in an area axially between the transfer gearset (VS) and the main gearset (HS),
a pressure chamber (211) of a servomechanism (210), for actuating a disk packet (200) of the second shift element (B), is spatially arranged on the side of the transfer gearset (VS) facing away from the main gearset (HS),
the transfer gearset (VS) comprises a sun gear (SO_VS), a ring gear (HO_VS) and a coupled carrier (ST_VS), on which inner and outer planetary gears (P1_VS, P2_VS) are mounted to rotate such that:
the inner planetary gears (P1_VS) of the transfer gearset (VS) mesh with the sun gear (SO_VS) and the outer planetary gears (P2_VS) of the transfer gearset (VS),
  the outer planetary gears (P2_VS) of the transfer gearset (VS) mesh with the inner planetary gears (P1_VS) and the ring gear (HO_VS) of the transfer gearset (VS),
  the carrier (ST_VS) of the transfer gearset (VS) forms the input element of the transfer gearset (VS) permanently connected with the drive input shaft (AN),
  the ring gear (HO_VS) of the transfer gearset (VS) forms the output element of the transfer gearset (VS) that can be connected with input elements of the main gearset (HS), and
  the sun gear (SO_VS) of the transfer gearset (VS) is fixed to the transmission housing (GG),
and the main gearset is a two-carrier, four-shaft transmission with two coupled individual planetary gearsets, comprising two sun gears (S1_HS, S2_HS), two ring gears (H1_HS, H2_HS), a first carrier (ST1_HS) on which first planetary gears (PL_HS) are mounted to rotate, and a coupled second carrier (ST2_HS), on which inner and outer planetary gears (PLi_HS, PLa_HS) are mounted to rotate, such that:
the first planetary gears (PL_HS) of the main gearset (HS) mesh with the first ring gear (H1_HS) and the first sun gear (S1_HS) of the main gearset (HS),
the inner planetary gears (PLi_HS) of the main gearset (HS) mesh with the outer planetary gears (PLa_HS) and the second sun gear (S2_HS) of the main gearset (HS),
the outer planetary gears (PLa_HS) of the main gearset (HS) mesh with the inner planetary gears (PLi_HS) and the second ring gear (H2_HS) of the main gearset (HS),
the first sun gear (S1_HS) and the coupled second carrier (ST2_HS) of the main gearset (HS) are connected with one another to form the first input element of the main gearset (HS), and are connected with the output elements (230, 330, 630) of the second, third and sixth shift elements (B, C, F),
the second sun gear (S2_HS) of the main gearset (HS) forms the second input element of the main gearset (HS) and is connected with the output element (130) of the first shift element (A),
the first carrier (ST1_HS) and the second ring gear (H2_HS) of the main gearset (HS) are connected with one another to form the third input element of the main gearset (HS), and are connected with the output elements (430, 530) of the fourth and fifth shift elements (D, E), and
the first ring gear (H1_HS) of the main gearset (HS) forms the output element of the main gearset (HS) and is connected with the drive output shaft (AB).

* * * * *